United States Patent
Miyairi et al.

(10) Patent No.: US 9,759,157 B2
(45) Date of Patent: Sep. 12, 2017

(54) HEAT/ACOUSTIC WAVE CONVERSION UNIT

(71) Applicant: NGK Insulators, Ltd., Nagoya (JP)

(72) Inventors: Yukio Miyairi, Nagoya (JP); Shinichi Miwa, Nagoya (JP); Tatsuo Kawaguchi, Nagoya (JP); Naomi Noda, Nagoya (JP); Yuji Deguchi, Nagoya (JP); Teruyoshi Mori, Nagoya (JP); Kazuhiko Hamatsuka, Nagoya (JP); Hiroyuki Suenobu, Nagoya (JP); Masayuki Hironaga, Nagoya (JP); Kazuhiko Kumazawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 181 days.

(21) Appl. No.: 14/849,984

(22) Filed: Sep. 10, 2015

(65) Prior Publication Data
US 2016/0084198 A1 Mar. 24, 2016

(30) Foreign Application Priority Data
Sep. 19, 2014 (JP) ................... 2014-192024

(51) Int. Cl.
| | |
|---|---|
| F02G 5/02 | (2006.01) |
| F03G 7/00 | (2006.01) |
| F02G 1/02 | (2006.01) |
| F02G 1/043 | (2006.01) |
| F25B 9/14 | (2006.01) |

(52) U.S. Cl.
CPC .............. *F02G 5/02* (2013.01); *F02G 1/02* (2013.01); *F02G 1/043* (2013.01); *F03G 7/002* (2013.01);
(Continued)

(58) Field of Classification Search
CPC .......... F02G 5/02; F02G 2243/54; F25B 9/14; F25B 9/145; F25B 2309/1402;
(Continued)

(56) References Cited

U.S. PATENT DOCUMENTS

| | | |
|---|---|---|
| 4,114,380 A | 9/1978 | Ceperley |
| 5,901,556 A | 5/1999 | Hofler |

FOREIGN PATENT DOCUMENTS

| | | |
|---|---|---|
| FR | 2 956 200 A1 | 8/2011 |
| JP | 2005-180294 A1 | 7/2005 |

(Continued)

OTHER PUBLICATIONS

U.S. Appl. No. 14/851,569, filed Sep. 11, 2015, Miyairi, Yukio.
(Continued)

*Primary Examiner* — Jonathan Matthias
(74) *Attorney, Agent, or Firm* — Burr & Brown, PLLC

(57) ABSTRACT

A heat/acoustic wave conversion unit includes a heat/acoustic wave conversion component and two heat exchangers. Hydraulic diameter HD of the cells in the heat/acoustic wave conversion component is 0.4 mm or less, and a ratio HD/L of HD to the length L of the heat/acoustic wave conversion component is from 0.005 to 0.02. One of the heat exchangers includes a heat-exchanging honeycomb structure and an annular tube that surrounds a circumferential face of the heat-exchanging honeycomb structure. The annular tube includes a structure body that is disposed in the channel to increase a contact area with the heated fluid, an inflow port into which the heated fluid flows, and an outflow port through which the heated fluid flows out. At least one of the heat-exchanging honeycomb structure and the structure body is made of a ceramic material that contains SiC as a main component.

15 Claims, 16 Drawing Sheets

(52) U.S. Cl.
CPC .......... *F25B 9/145* (2013.01); *F02G 2243/54* (2013.01); *F25B 2309/1402* (2013.01)

(58) Field of Classification Search
CPC ...... F25B 2309/1403; F25B 2309/1405; F25B 2309/1412
See application file for complete search history.

(56) References Cited

FOREIGN PATENT DOCUMENTS

| | | |
|---|---|---|
| JP | 2012-112621 A1 | 6/2012 |
| JP | 2012-237295 A1 | 12/2012 |

OTHER PUBLICATIONS

U.S. Appl. No. 14/851,628, filed Sep. 11, 2015, Miyairi, Yukio.
U.S. Appl. No. 14/853,015, filed Sep. 14, 2015, Miyairi, Yukio.
U.S. Appl. No. 14/853,084, filed Sep. 14, 2015, Miyairi, Yukio.
U.S. Appl. No. 14/934,487, filed Nov. 6, 2015, Miyairi, Yukio.
M. Lee, et al., "*Micro Thermophotovoltaic Power Generation System,*" http://www.mesl.t.u-tokyo.ac.jp/en/research/tpv.html, Yuji Suzuki and Kenichi Morimoto Lab., The University of Tokyo (with English translation).
Toshihiro Kanematsu, et al., "*A New Method of Fabricating Micro Honeycomb Structure by Controlling Gas Pressure,*" http://www.ricoh.com/ja/technology/tech/009_honeycomb.html, Ricoh Technical Report No. 35, Dec. 2009, pp. 80-86.
Extended European Search Report (Application No. 15185204.3) dated Jan. 11, 2016.

HIGH-TEMPERATURE HEATED FLUID (a)

(b)

(a)

(b)

HEAT/ACOUSTIC WAVE CONVERSION UNIT

The present application is an application based on JP 2014-192024 filed on Sep. 19, 2014 with Japan Patent Office, the entire contents of which are incorporated herein by reference.

BACKGROUND OF THE INVENTION

Field of the Invention

The present invention relates to heat/acoustic wave conversion units. More particularly, the present invention relates to a heat/acoustic wave conversion unit including a heat/acoustic wave conversion component to convert heat and acoustic-wave energy mutually, and a heat exchanger.

Description of the Related Art

Recently society as a whole has been becoming more and more interested in effective use of energy resources, and so various techniques to reuse energy have been developed on a trial basis. Among them, an energy recycling system attracts attention because the acquisition rate (energy efficiency) of the energy acquired is high. The energy recycling system converts heat of high-temperature fluid, such as exhaust gas from automobiles, to acoustic-wave energy by a thermoacoustic effect, and finally outputs such energy in the form of electric power. Various efforts have been made toward the practical use of such a system.

Simply speaking, a thermoacoustic effect is a phenomenon to generate acoustic waves using heat. More specifically, the thermoacoustic effect is a phenomenon to oscillate an acoustic-wave transmitting medium in the thin tube to generate acoustic waves when heat is applied to one end part of a thin tube to form a temperature gradient at the thin tube. Since it is effective to generate acoustic waves using a large number of such thin tubes at one time, a honeycomb structure including a large number of through holes each having a small diameter is often used as a collective form of the thin tubes causing a thermoacoustic effect (see e.g., Patent Documents 1 to 3).

Meanwhile the honeycomb structure itself has been used for various purposes, without reference to the thermoacoustic effect, because of its three-dimensional geometry having a large surface area. For instance, a typical example is a honeycomb structure to load catalyst for exhaust purification to remove fine particles from exhaust gas of automobiles, and various types of structures have been developed conventionally. Another example is a honeycomb structure having small through holes of a few tens to a few hundreds µm in diameter, which is developed as an ion catalyst (see Non-Patent Documents 1, 2, for example). They are manufactured by a chemical method solely, which is totally different from extrusion that is typically used for honeycomb structures as filters.

In this way, although honeycomb structures have been well known conventionally, they are required to have specific properties to be suitable for a thermoacoustic effect when these structures are used as heat/acoustic wave conversion components to exert the thermoacoustic effect. For example, in order to exert a high thermoacoustic effect, the through holes preferably have a small diameter, and Patent Document 3 proposes a honeycomb structure for a thermoacoustic effect, including through holes having a diameter of 0.5 mm or more and less 1.0 mm that is smaller than that of honeycomb structures to load catalyst for exhaust purification. Although the honeycomb structures in Non-Patent Documents 1 and 2 have a very small pore diameter, they are manufactured by a chemical method solely, and so they have limited lengths and durability and so are not suitable for the honeycomb structure for a thermoacoustic effect very much. On the other hand, the honeycomb structure for a thermoacoustic effect of Patent Document 3 satisfies a necessary condition that is durable in the use as a heat/acoustic wave conversion component to exert a thermoacoustic effect, and then has the advantage of having an excellent heat/acoustic wave conversion function.

[Patent Document 1] JP-A-2005-180294
[Patent Document 2] JP-A-2012-112621
[Patent Document 3] JP-A-2012-237295
[Non-Patent Document 1] URL:http://www.mesl.t.u-tokyo.ac.jp/ja/research/tpv.html on the Internet
[Non-Patent Document 2] URL:http://www.ricoh.com/ja/technology/tech/009_honeycomb.html on the Internet

SUMMARY OF THE INVENTION

However, in order to convert heat of high-temperature fluid such as exhaust gas from an automobile into acoustic-wave energy at high energy conversion efficiency, it is not enough that a honeycomb structure for thermoacoustic effect simply is allowed to have high heat/acoustic wave conversion capability. In fact, if heat of high-temperature fluid is diffused to the surrounding without transmitting to the end part on the high-temperature side of the honeycomb structure sufficiently, such high heat/acoustic wave conversion capability of the honeycomb structure for thermoacoustic effect cannot be used sufficiently, and it is difficult to achieve high energy efficiency. In this way, properties of a heat exchanger on the high-temperature side are very important, which gives heat to the high-temperature end part of the honeycomb structure for thermoacoustic effect.

Especially in a system to convert heat of high-temperature fluid such as exhaust gas from an automobile into acoustic-wave energy, the heat exchanger on the high-temperature side will be exposed to very high-temperature circumstances for a long time, and so the heat exchanger on the high-temperature side is required to have high heat durability against heat. Moreover, in order to allow the system to achieve high energy conversion efficiency, the heat exchanger on the high-temperature side is also required to have high heat conductivity to transmit a large amount of heat, which is given to the heat exchanger on the high-temperature side, to the end part of the honeycomb structure on the high-temperature side while suppressing the diffusion of this large amount of heat to the surrounding.

In the field of conventional thermoacoustic techniques, including Patent Documents 1 to 3, such importance of a heat exchanger to make use of the capability of the honeycomb structure for thermoacoustic effect is hardly recognized, and so further improvement is required for the combination of a heat exchanger and a honeycomb structure for thermoacoustic effect.

In view of the above-mentioned circumstances, the present invention aims to provide a heat/acoustic wave conversion unit which includes a heat/acoustic wave conversion component having a honeycomb structure and a pair of heat exchangers to exchange heat with both end parts of this heat/acoustic wave conversion component, and which improves durability and energy conversion efficiency.

To fulfill the above-mentioned object, the present invention provides the following heat/acoustic wave conversion unit.

[1] A heat/acoustic wave conversion unit, including a heat/acoustic wave conversion component having a first end face and a second end face, the heat/acoustic wave conversion component including a partition wall that defines a plurality of cells extending from the first end face to the second end face, inside of the cells being filled with working fluid that oscillates to transmit acoustic waves, the heat/acoustic wave conversion component mutually converting heat exchanged between the partition wall and the working fluid and energy of acoustic waves resulting from oscillations of the working fluid; a low-temperature side heat exchanger that is disposed adjacent to a first end part of the heat/acoustic wave conversion component on the first end face side, the low-temperature side heat exchanger exchanging heat with the first end part; and a high-temperature side heat exchanger that is disposed adjacent to a second end part of the heat/acoustic wave conversion component on the second end face side, the high-temperature side heat exchanger receiving inflow of heated fluid and absorbing heat from the heated fluid, and supplying the heat to the second end part so as to keep the second end part at a state of higher temperature than at the first end part, wherein hydraulic diameter HD of the heat/acoustic wave conversion component is 0.4 mm or less, where the hydraulic diameter HD is defined as HD=4×S/C, where S denotes an area of a cross section of each cell perpendicular to the cell extending direction and C denotes a perimeter of the cross section, let that the heat/acoustic wave conversion component has a length L from the first end face to the second end face, a ratio HD/L of the hydraulic diameter HD to the length L of the heat/acoustic wave conversion component is 0.005 or more and less than 0.02, and the high-temperature side heat exchanger includes: a heat-exchanging honeycomb structure having a partition wall that defines two or more cells which extend in the extending direction between two end faces, an opposed end face facing to the second end face of the heat/acoustic wave conversion component and a non-opposed end face facing to an opposite side from the heat/acoustic wave conversion component when viewed from the opposed end face, and which are filled with the working fluid internally so as to be a propagation path of acoustic waves due to oscillations of the working fluid; and an annular tube that surrounds a circumferential face of the heat-exchanging honeycomb structure, which extends between the two end faces, and that defines a channel through which the heated fluid flows, the annular tube including a structure body that is disposed in the channel to increase a contact area with the heated fluid, an inflow port into which the heated fluid flows, and an outflow port through which the heated fluid flows out, wherein at least one of the heat-exchanging honeycomb structure and the structure body is made of a ceramic material that contains SiC as a main component.

[2] The heat/acoustic wave conversion unit according to [1], wherein the heat/acoustic wave conversion component has an open frontal area at an end face of 93% or less.

[3] The heat/acoustic wave conversion unit according to [1] or [2], wherein the cells in the heat/acoustic wave conversion component have a triangular shape in the cross section.

[4] The heat/acoustic wave conversion unit according to any one of [1] to [3], wherein let that D denotes an equivalent circle diameter of a cross section of the heat/acoustic wave conversion component in a plane perpendicular to the extending direction, the equivalent circle diameter D is 30 mm or more and 100 mm or less, and a ratio L/D of the length L of the heat/acoustic wave conversion component to the equivalent circle diameter D is 0.3 or more and 1.0 or less.

[5] The heat/acoustic wave conversion unit according to [1], wherein the heat/acoustic wave conversion component includes: a plurality of monolithic honeycomb segments, each including the partition wall that defines some of the plurality of cells, and mutually converting heat exchanged between the partition wall and the working fluid and energy of acoustic waves resulting from oscillations of the working fluid; a bonding part that mutually bonds side faces of the plurality of honeycomb segments; and a circumferential wall that surrounds a circumferential face of a honeycomb structure body made up of the plurality of honeycomb segments and the bonding part, wherein an open frontal area at each end face of the honeycomb segments is 60% or more and 93% or less, and heat conductivity of a material making up the honeycomb segments is 5 W/mK or less.

[6] The heat/acoustic wave conversion unit according to [5], wherein the cells have the cross section of a triangular shape, and a cross section of the honeycomb segments that is parallel to the cross section of the cells has a hexagonal shape.

[7] The heat/acoustic wave conversion unit according to [5], wherein the cells have the cross section of a triangular shape, and a cross section of the honeycomb segments that is parallel to the cross section of the cells has a triangular shape.

[8] The heat/acoustic wave conversion unit according to any one of [5] to [7], wherein Young's modulus of materials making up the bonding part and the circumferential wall are both less than 30% of Young's modulus of a material making up the honeycomb segments, a thermal expansion coefficient of the material making up the bonding part is 70% or more and less than 130% of a thermal expansion coefficient of the material making up the honeycomb segments, and heat capacity of the material making up the bonding part is 50% or more of heat capacity of the material making up the honeycomb segments.

[9] The heat/acoustic wave conversion unit according to any one of [5] to [8], wherein a bonding width of two of the honeycomb segments bonded mutually is 0.2 mm or more and 4 mm or less, and in a plane perpendicular to the extending direction, a ratio of a total cross-sectional area of the bonding part to a cross-sectional area of the heat/acoustic wave conversion component is 10% or less.

[10] The heat/acoustic wave conversion unit according to [5] to [9], wherein each of the plurality of honeycomb segments has a cross-sectional area in a plane perpendicular to the extending direction that is 3 cm$^2$ or more and 12 cm$^2$ or less.

[11] The heat/acoustic wave conversion unit according to any one of [5] to [10], wherein let that D denotes an equivalent circle diameter of a cross section of the heat/acoustic wave conversion component in a plane perpendicular to the extending direction, the equivalent circle diameter D is 30 mm or more and 100 mm or less, and a ratio L/D of the length L of the honeycomb segments to the equivalent circle diameter D is 0.3 or more and 1.0 or less.

[12] The heat/acoustic wave conversion unit according to any one of [1] to [11], wherein the heat-exchanging honeycomb structure directly comes in contact with heated fluid flowing through the channel at the circumferential face to absorb heat from the heated fluid, and transmits the absorbed heat from the opposed end face to the second end part of the heat/acoustic wave conversion component.

[13] The heat/acoustic wave conversion unit according to any one of [1] to [12], wherein the opposed end face of the heat-exchanging honeycomb structure is in contact with the second end face of the heat/acoustic wave conversion component.

[14] The heat/acoustic wave conversion unit according to any one of [1] to [13], wherein the plurality of cells in the heat/acoustic wave conversion component and the two or more cells in the heat-exchanging honeycomb structure are both arranged periodically in a plane perpendicular to the extending direction, and the two or more cells have a period in one direction in the plane that is integral multiples of ten or more of a period of the plurality of cells in the one direction.

[15] The heat/acoustic wave conversion unit according to any one of [1] to [14], wherein the heat-exchanging honeycomb structure includes a slit extending in the extending direction at the circumferential face.

In the heat/acoustic wave conversion unit of the present invention, a heat-exchanging honeycomb structure made of a ceramic material improves durability against heat. Further the ceramic material containing SiC as a main improves the energy conversion efficiency.

DESCRIPTION OF THE PREFERRED EMBODIMENTS

The following describes embodiments of the present invention, with reference to the drawings. The present invention is not limited to the following embodiments, and is to be understood to include the following embodiments, to which modifications and improvements are added as needed based on the ordinary knowledge of a person skilled in the art without departing from the scope of the present invention.

Figure 1:
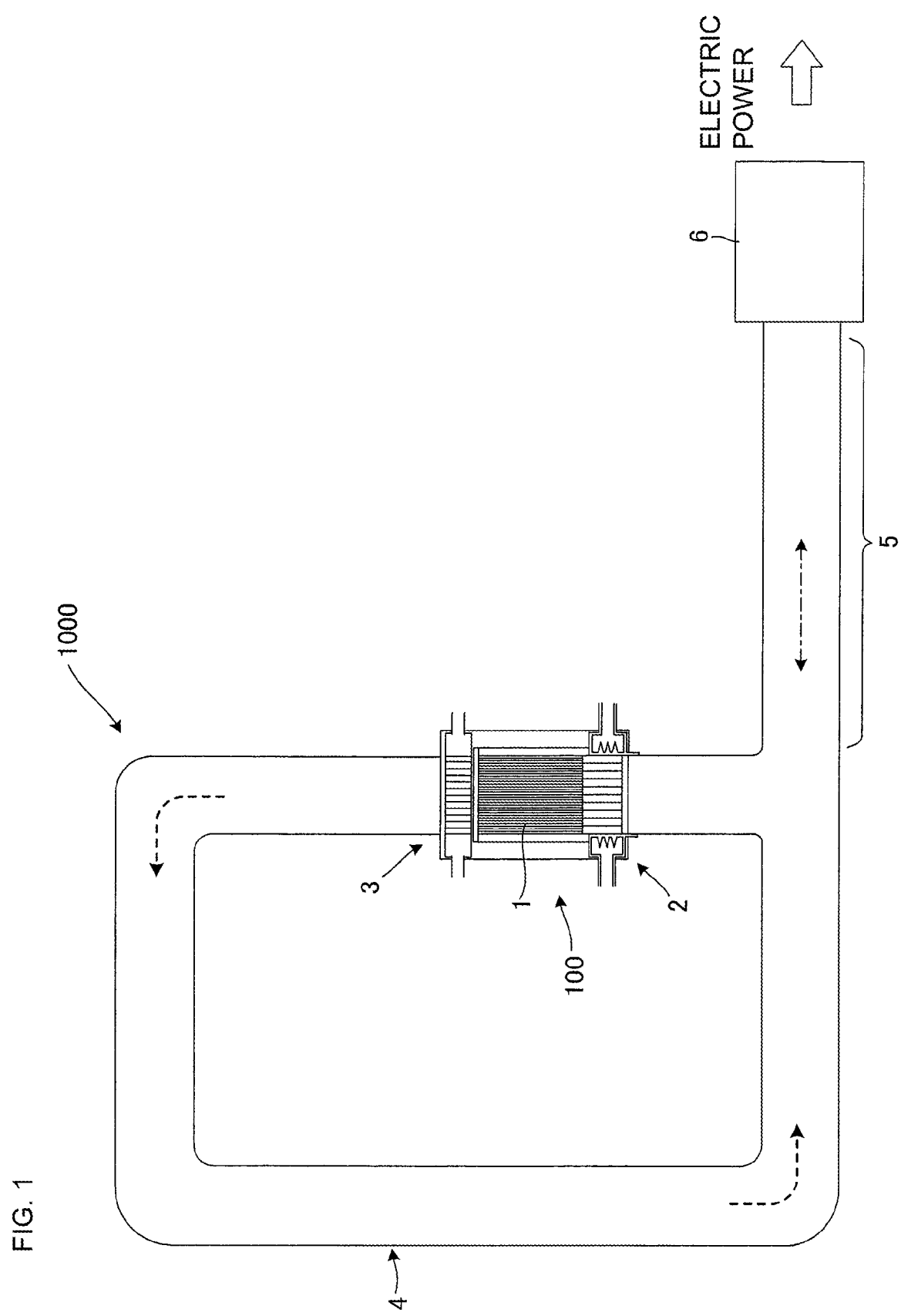
FIG. 1 schematically shows the configuration of a power generation system, to which one embodiment of a heat/acoustic wave conversion unit and a heat/acoustic wave conversion component of the present invention is applied.

FIG. 1 schematically shows the configuration of a power generation system, to which one embodiment of a heat/acoustic wave conversion unit of the present invention is applied.

A power generation system 1000 in FIG. 1 includes a heat/acoustic wave conversion unit 100, a looped tube 4, a resonant tube 5 and an energy converter 6.

The looped tube 4 is a loop-shaped tube that is connected to an end on the upper side (upper end) and an end on the lower side (lower end) in the drawing of the heat/acoustic wave conversion unit 100. The resonant tube 5 is a straight tube, having one end connected to the looped tube 4 and the other end connected to the energy converter 6. Herein the resonant tube 5 and the energy converter 6 as a whole makes up a tube that is substantially closed in the end on the right side of the drawing.

The heat/acoustic wave conversion unit 100 includes a heat/acoustic wave conversion component 1, a high-temperature side heat exchanger 2 and a low-temperature side heat exchanger 3.

The high-temperature side heat exchanger 2 receives the inflow of heated fluid at high temperatures (e.g., high-temperature exhaust gas), and transmits the heat thereof to the lower end of the heat/acoustic wave conversion component 1 of FIG. 1 to let the heated fluid having a temperature lower than that at the time of inflow flow out. On the other hand, the low-temperature side heat exchanger 3 receives the inflow of cooled fluid (e.g., water) at relatively low temperatures compared with the heated fluid flowing in the high-temperature side heat exchanger 2 and transmits the cold heat to the upper end of the heat/acoustic wave conversion component 1 of FIG. 1 to let the cooled fluid having a temperature higher than that at the inflow flow out. Such functions of the high-temperature side heat exchanger 2 and the low-temperature side heat exchanger 3 yield the state where the lower end of the heat/acoustic wave conversion component 1 has a relatively higher temperature than at the upper end. The heat/acoustic wave conversion component 1 has a honeycomb structure including a plurality of through holes (hereinafter called cells) like thin tubes that are elongated vertically in the drawing. Each cell is partitioned from the neighboring cells by a partition wall, and is in communication with the looped tube 4 via the high-temperature side heat exchanger 2 and the low-temperature side heat exchanger 3.

Herein the looped tube 4, the resonant tube 5 and each cell of the heat/acoustic wave conversion component 1 are internally filled with working fluid that generates oscillations of longitudinal waves and transmits acoustic waves. An example of the working fluid includes gas having low viscosity and being less reactive, such as rare gas.

In such a heat/acoustic wave conversion component 1, when there is a temperature difference as stated above at the both ends, the working fluid in each cell starts to oscillate in the penetrating direction of the cells. Then the oscillations are transmitted as acoustic waves externally from the heat/acoustic wave conversion component 1. Such a phenomenon of the working fluid oscillating in response to the given temperature difference is called self-induced oscillations, and is a conventionally well-known phenomenon that occurs when a temperature gradient is given to a thin tube. A thermoacoustic effect refers to generation of acoustic waves due to the self-induced oscillation of working fluid resulting from heat. The following briefly describes this self-induced oscillation (a lot of documents describe the details, and Patent Document 3 also provides the detailed descriptions thereof, for example).

When giving a temperature gradient to a thin tube, then working fluid inside of the thin tube on the high-temperature side absorbs heat from the wall surface of the tube and expands from the high-temperature side to the low-temperature side. Then, the working fluid releases heat to the wall surface on the low-temperature side and is compressed, and then returns back to the high-temperature side. Such exchange of heat with the wall surface and expansion/compression are repeated, which results in oscillation of the working fluid in the elongation direction of the tube. Simply speaking, such motion of the working fluid can said to be the motion to convey heat so as to alleviate (weaken) the temperature gradient at the wall surface. As can be clear from this description as well, such a phenomenon occurs only when the tube is so thin that the thermal effects from the wall surface are large on the working fluid inside. That is, as the tube is made thicker, the thermal effect from the wall surface decreases (i.e., it becomes closer to an adiabatic state), and so such self-induced oscillation hardly occurs. Then, the thickness of the tube is an important factor to generate acoustic waves by the self-induced oscillation, and the thickness of the tube can be evaluated more quantitatively based on a hydraulic diameter HD that is defined as $HD=4\times S/C$, where S denotes the cross-sectional area of the tube and C denotes the perimeter of this section.

Referring back to FIG. 1, the power generation system 1000 is described below again.

Since the heat/acoustic wave conversion component 1 includes a plurality of cells like thin tubes and the self-induced oscillation occurs in each cell, acoustic waves as the collection of oscillations of the working fluid in these plurality of cells are then issued from the heat/acoustic wave conversion component 1 to the looped tube 4. Then such acoustic waves are transmitted through the looped tube 4 in the direction of the dotted arrows in the drawing. Most of the acoustic waves transmitted through the looped tube 4 travels in the resonant tube 5 to the right in the drawing. As described above, the resonant tube 5 and the energy converter 6 as a whole makes up a tube that is substantially closed in the end on the right side of the drawing, and so some of the acoustic waves are reflected and travel to the left in the opposite direction in the drawing. Then, both of these traveling waves are overlapped in the resonant tube 5. At this time, if the frequency of the traveling waves matches with the resonant frequency that is determined, for example, by the length of the resonant tube 5 then so-called resonance occurs in the resonant tube 5, and steady waves are generated, which are overlapped waves of both of these traveling waves and have the resonant frequency. In the drawing, the double-headed arrow in the dashed-dotted line indicates the presence of the steady waves.

Herein the energy converter 6 is equipped with a mechanism not shown that is capable of changing the effective length of the resonant tube 5, which can adjust the resonance frequency so as to cause the resonance. An exemplary mechanism to change the effective length of the resonant tube 5 includes one described in Patent Document 1, for example. Although the following describes the case where the effective length of the resonant tube 5 can be changed, in the power generation system 1000 of FIG. 1, a dominant frequency component of the frequency components of acoustic waves generated at the heat/acoustic wave conversion component 1 and traveling through the looped tube 4 may be determined beforehand, and the length of the resonant tube 5 may be configured beforehand to be a special length which makes the frequency of the dominant frequency component the resonance frequency.

The energy converter 6 is equipped with a mechanism to convert acoustic waves into electrical signals as well. An exemplary conversion mechanism of such a type includes a mechanism equipped with a microphone as described in Patent Document 1. Although the conversion mechanism including a microphone is the simplest one, the conversion mechanism is not limited to such a mechanism including a microphone. For instance, conventionally known various mechanisms (e.g., the mechanism of Patent Document 2), which is to convert acoustic-wave energy to mechanical energy and then convert such mechanical energy to electric power by electromagnetic induction, can be used.

With the configuration as stated above, the power generation system 1000 of FIG. 1 can convert heat of high-temperature heated fluid (e.g., high-temperature exhaust gas) flowing into the high-temperature side heat exchanger 2 into electric power, and so enables effective use (recycling) of energy.

Next the following describes a cold heat generation system, to which the heat/acoustic wave conversion unit 100 and the heat/acoustic wave conversion component 1 as stated above are applied.

Figure 2:
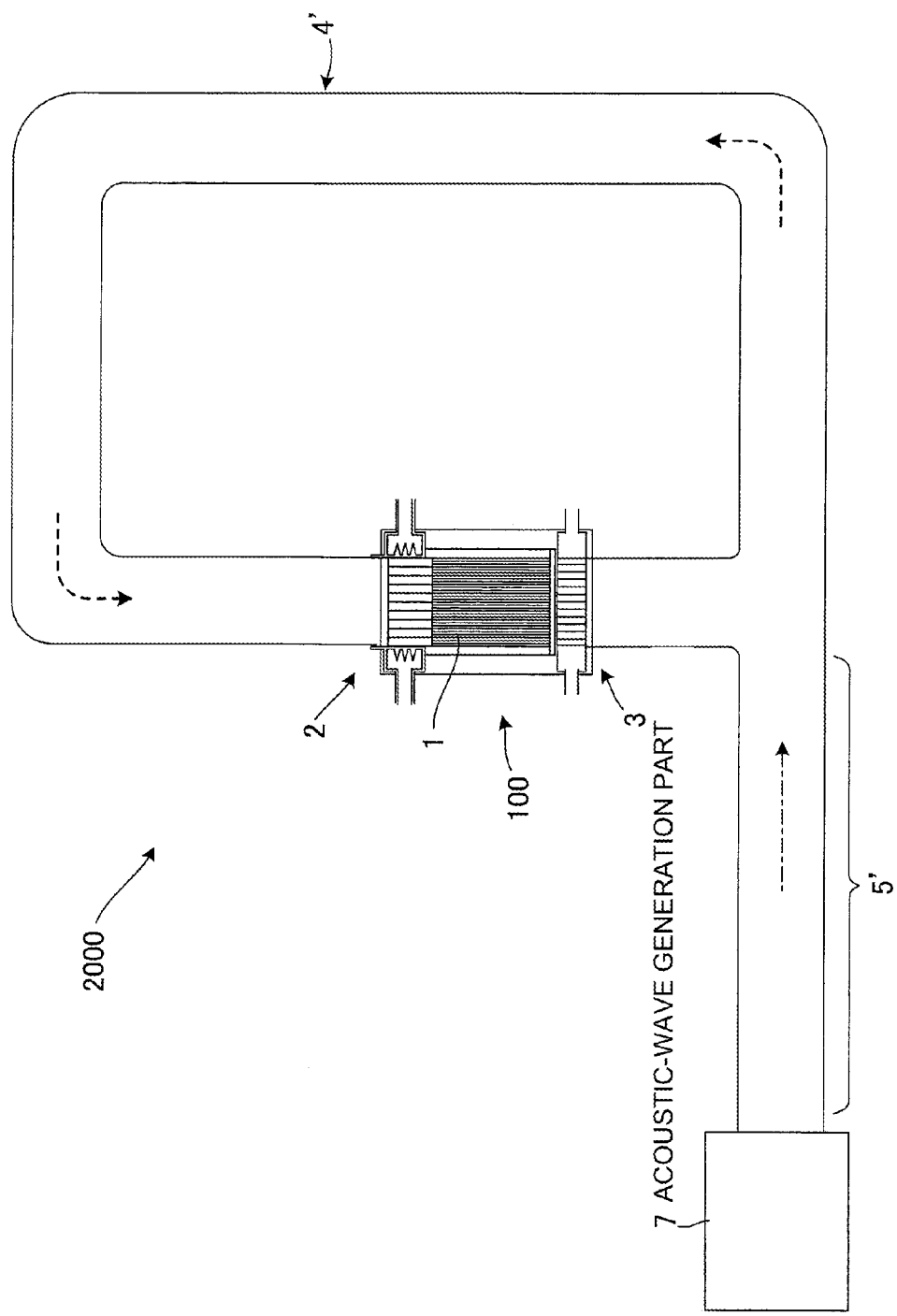
FIG. 2 schematically shows a cold heat generation system, to which the heat/acoustic wave conversion unit and the heat/acoustic wave conversion component in FIG. 1 are applied.

FIG. 2 schematically shows a cold heat generation system, to which the heat/acoustic wave conversion unit 100 and the heat/acoustic wave conversion component 1 in FIG. 1 are applied.

A cold heat generation system 2000 in FIG. 2 includes a looped tube 4', a transmission tube 5', an acoustic-wave generation part 7, and the heat/acoustic wave conversion unit 100 described referring to FIG. 1.

The looped tube 4' is a loop-shaped tube that is connected to an end on the upper side (upper end) and an end on the lower side (lower end) of the heat/acoustic wave conversion unit 100 in FIG. 2, and is in communication with the plurality of cells of the heat/acoustic wave conversion component 1 via the high-temperature side heat exchanger 2 and the low-temperature side heat exchanger 3. The transmission tube 5' is a straight tube, having one end connected to the looped tube 4' and the other end connected to the acoustic-wave generation part 7. The acoustic-wave generation part 7 has a function of generating acoustic waves, and an example of the acoustic-wave generation part 7 includes a speaker that receives electric power and outputs acoustic waves. Another example is a system that is obtained by removing the energy converter 6 from the power generation system 1000 in FIG. 1 and that receives heat and generates acoustic waves (in this case, the resonant tube 5 on the right side is an open end where no reflections occur, and so unlike the state of FIG. 1, traveling waves toward right are transmitted in the resonant tube 5).

Although the heat/acoustic wave conversion unit 100 has the same configuration as that described with reference to FIG. 1, it is configured so that, unlike FIG. 1, cooled fluid (e.g., water), which is similar to the cooled fluid flowing into the low-temperature side heat exchanger 3 in FIG. 1, flows into both of the high-temperature side heat exchanger 2 and the low-temperature side heat exchanger 3 of FIG. 2.

Herein the looped tube 4', the transmission tube 5' and each cell of the heat/acoustic wave conversion component 1 are internally filled with working fluid that generates oscillations of longitudinal waves and transmits acoustic waves. Working fluid similar to that used in the power generation system 1000 of FIG. 1 can be used.

Acoustic waves generated at the acoustic-wave generation part 7 are transmitted through the transmission tube 5' in the direction of the dashed-dotted arrow in FIG. 2, and then are transmitted through the looped tube 4' in the direction of the dashed line arrow in FIG. 2. Then, the acoustic waves reach the heat/acoustic wave conversion unit 100, and travel in each cell from the upper side in FIG. 2 of the heat/acoustic wave conversion component 1. At this time, due to heat transport by acoustic waves, the system can have a state where the end on the high-temperature side heat exchanger 2 side has a relatively higher in temperature than the end on the low-temperature side heat exchanger 3 side. At the high-temperature side heat exchanger 2, cooled fluid close to the ambient temperature flows in, and the fluid at a temperature higher than the ambient temperature flows out. On the other hand, since heat is transported to the end on the high-temperature side heat exchanger 2 side due to heat transport by acoustic waves, the end of the heat/acoustic wave conversion component 1 on the low-temperature side heat exchanger 3 side has a temperature lower than the ambient temperature. Then at the low-temperature side heat exchanger 3, cooled fluid close to the ambient temperature flows in, and the fluid at a temperature lower than the ambient temperature flows out because heat is taken by the end of the heat/acoustic wave conversion component 1 on the low-temperature side heat exchanger 3 side. In other words, cold heat is output in the form of cold water.

With the configuration as stated above, the cold heat generation system 2000 in FIG. 2 can output cold heat using acoustic-wave energy generated at the acoustic-wave generation part 7. Especially when it includes, as the acoustic-wave generation part 7, the system corresponding to the power generation system 1000 of FIG. 1 other than the energy converter 6, high-temperature heated fluid (e.g., high-temperature exhaust gas) flowing into the high-temperature side heat exchanger 2 of FIG. 1 can be converted into cold heat, which then enables effective use (recycling) of energy.

As stated above, in the power generation system 1000 in FIG. 1 and the cold heat generation system 2000 in FIG. 2, the heat/acoustic wave conversion unit 100 that is one embodiment of the present invention plays a very important role. Then the following describes the heat/acoustic wave conversion unit 100 in more details, by way of an exemplary situation where that is used in the power generation system 1000 of FIG. 1. The following describes the power generation system 1000 of FIG. 1, by way of an example where high-temperature heated fluid (e.g., exhaust gas itself) at about 400 to 600° C. that are typical temperatures of the exhaust gas from automobiles flows in the high-temperature side heat exchanger 2 of FIG. 1, and low-temperature cooled fluid (e.g., water) at about 20 to 70° C. flows into the low-temperature side heat exchanger 3. In this case, a temperature difference between both ends of the heat/acoustic wave conversion component 1 is about 330 to 580° C.

Naturally the properties of the heat/acoustic wave conversion unit 100 described below are the same as in the case where it is used in the cold heat generation system 2000 of FIG. 2 as well.

Figure 3:
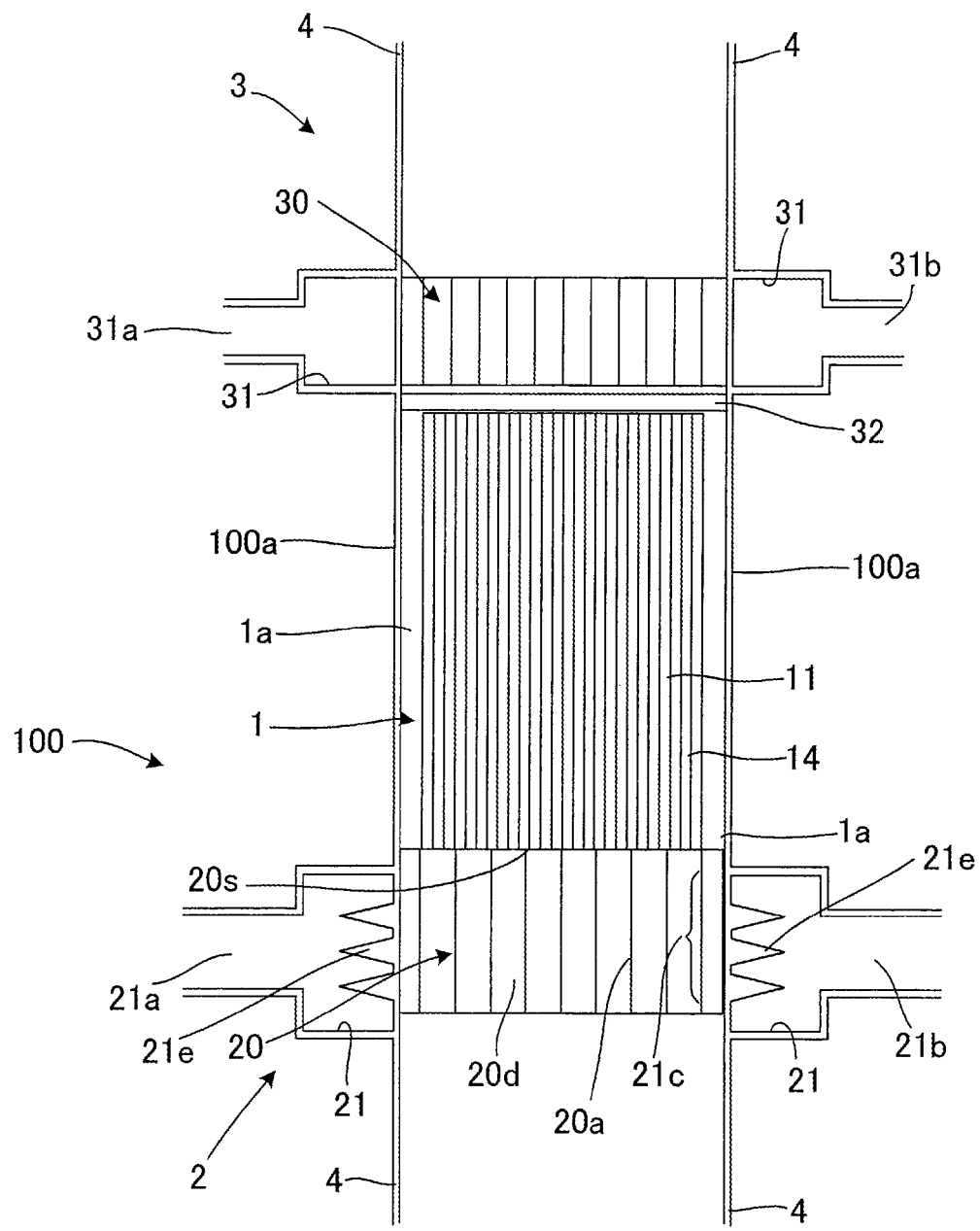
FIG. 3 schematically shows the configuration of the heat/acoustic wave conversion unit of FIG. 1.

FIG. 3 schematically shows the configuration of the heat/acoustic wave conversion unit 100 of FIG. 1.

The heat/acoustic wave conversion component 1 has a honeycomb structure in which a plurality of cells 14, each being a thin-tube like through hole, are partitioned and defined by a partition wall 11. Herein, the word "cell" in the present specification refers to a through hole only that does not include the partition wall. The heat/acoustic wave conversion component 1 actually has a structure including several honeycomb segments having such a honeycomb structure that are bonded, and such a segmented structure will be described later. FIG. 3 shows the arrangement of the cells 14 only, for ease of explanation. Each cell 14 has a penetrating direction (an extending direction in which each cell 14 extends) that is the vertical direction of FIG. 3, and is open at both end faces of an end face on the low-temperature side heat exchanger 3 side and an end face of the high-temperature side heat exchanger 2 side. The end face of the heat/acoustic wave conversion component 1 on the low-temperature side heat exchanger 3 side is in contact with the metal member 32, and is opposed to the low-temperature side heat exchanger 3 with the metal member 32 disposed therebetween. Although the metal member 32 is disposed in this case, the present invention may have a form without the metal member 32. When the metal member 32 is omitted, working fluid in contact with a mesh lamination body 30 described later is cooled, and then the cooled working fluid comes into contact with the vicinity of the end face of the heat/acoustic wave conversion component 1 due to the displacement of the working fluid, which corresponds to oscillations of acoustic waves, and cools the vicinity of the end face. When the metal member 32 is omitted, a gap between the heat/acoustic wave conversion component 1 and the low-temperature side heat exchanger 3 is as small as possible preferably.

The metal member 32 is a metal member having a plate shape, at a center part of which a plurality of parallel slits (not shown) are formed, and FIG. 3 shows only a side-face part (thickness part) of the plate shape.

The low-temperature side heat exchanger 3 includes the mesh lamination body 30 including a plurality of metal mesh plates (e.g., made of copper). The low-temperature side heat exchanger 3 includes a low-temperature side annular tube 31 also that is an annular tube surrounding the side face of the mesh lamination body 30. FIG. 3 schematically shows the state where such a low-temperature side annular tube 31 surrounding the side face of the mesh lamination body 30 sandwiches the mesh lamination body 30 from both sides at a cross-section including an inflow port 31a and an outflow port 31b. This low-temperature side annular tube 31 has a function of receiving, from the inflow port 31a, the inflow of cooled fluid (e.g., water) that is at a relatively low temperature with reference to the heated fluid flowing into the high-temperature side heat exchanger 2 described later, and transmitting cold heat of the cooled fluid to the mesh lamination body 30 (in other words, transmits heat at the mesh lamination body 30 to the cooled fluid) and letting cooled fluid with an increased temperature flow out from the outflow port 31b.

Cold heat transmitted to the mesh lamination body 30 is transmitted to the working fluid in contact therewith, and is then transmitted to the end face of the heat/acoustic wave conversion component 1 on the low-temperature side heat exchanger 3 side due to displacement of acoustic waves to cool the end of the heat/acoustic wave conversion component 1 on the low-temperature side heat exchanger 3 side. To this end, the metal member 32 is preferably made of a material having large heat conductivity, which may be made of e.g., copper.

That is the detailed description of the configuration of the low-temperature side heat exchanger 3, and the heat/acoustic wave conversion unit of the present invention is not limited especially about the details of the low-temperature side heat exchanger, and a conventionally known heat exchanger may be used. The same configuration as that of the high-temperature side heat exchanger 2 described later may be used.

The side face of the heat/acoustic wave conversion component 1 is surrounded by the interference member 1a, and FIG. 3 schematically shows the cross section of the surrounding interference member 1a as two parts that sandwich the heat/acoustic wave conversion component 1 from both of right and left sides in the drawing. This interference member 1a has a function as a thermal insulator to avoid heat transmission between the ends of the heat/acoustic wave conversion component 1 on the low-temperature side heat exchanger 3 side and on the high-temperature side heat exchanger 2 side via the surrounding environment outside of the heat/acoustic wave conversion component 1.

The high-temperature side heat exchanger 2 includes a heat-exchanging honeycomb structure 20 and a high-temperature side annular tube 21. The heat-exchanging honeycomb structure 20 has a honeycomb structure similarly to the heat/acoustic wave conversion component 1, including two or more cells 20d, each being a thin-tube like through hole penetrating vertically in FIG. 3, that are partitioned and defined by a partition wall 20a. The high-temperature side annular tube 21 is an annular tube surrounding the side face of the heat-exchanging honeycomb structure 20, and has a function of receiving, from an inflow port. 21a, the inflow of high-temperature heated fluid (e.g., high-temperature exhaust gas), transmitting heat of the heated fluid to the heat-exchanging honeycomb structure 20 and letting heated fluid with a decreased temperature flow out from an outflow port 21b. Then as shown in FIG. 3, the high-temperature side annular tube 21 internally includes a metal or ceramic fin 21e containing SiC (silicon carbide) as a main component to increase the contact area with the heated fluid.

Figure 4:
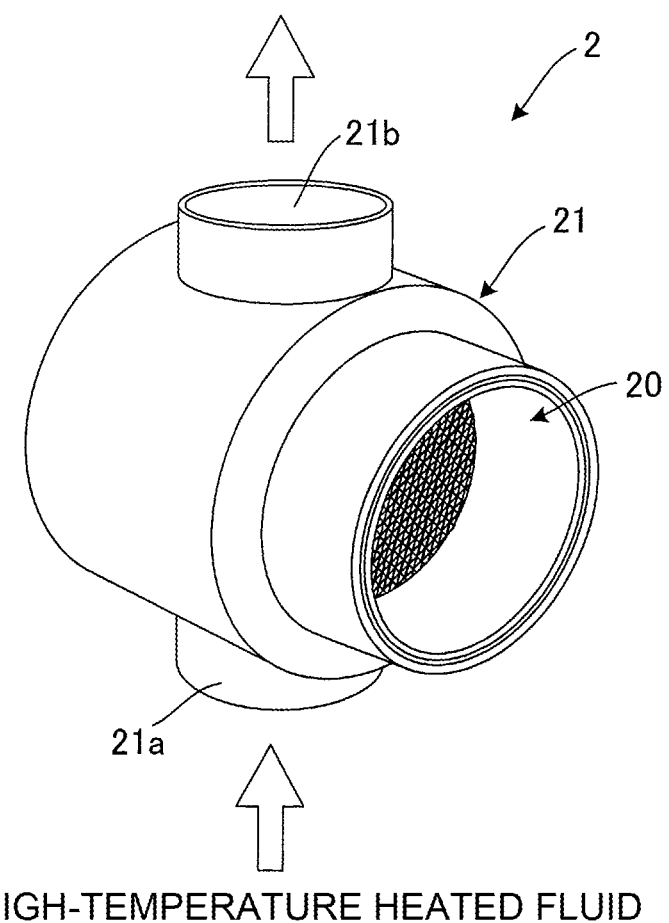
FIG. 4 is a perspective view showing the appearance of the high-temperature side heat exchanger in the heat/acoustic wave conversion unit of FIG. 3.
Figure 5:
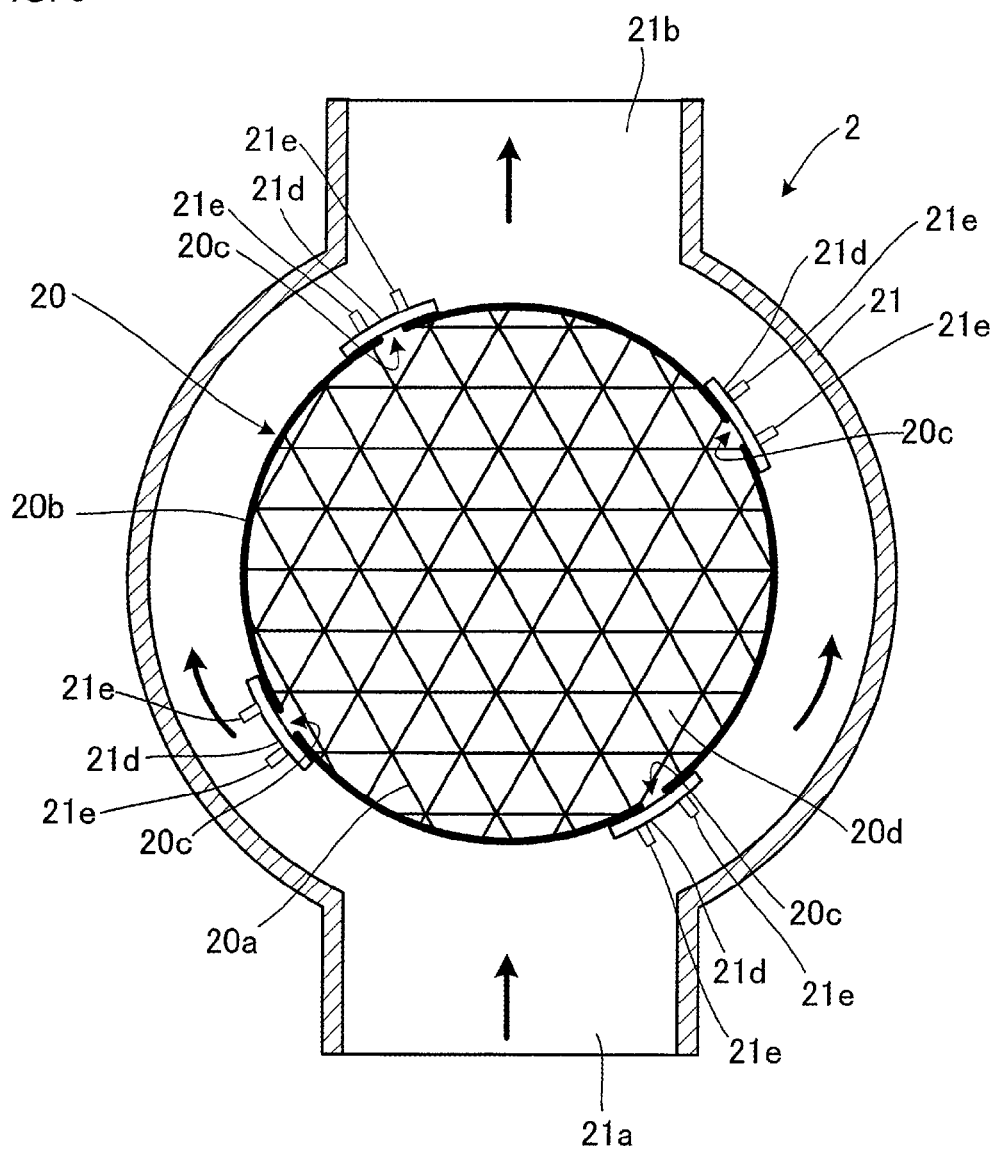
FIG. 5 is a cross-sectional view of the high-temperature side heat exchanger when viewing an inflow port and an outflow port of the high-temperature side annular tube in a plane.

FIG. 4 is a perspective view showing the appearance of the high-temperature side heat exchanger 2 in the heat/acoustic wave conversion unit 100 of FIG. 3, and FIG. 5 is a cross-sectional view of the high-temperature side heat exchanger 2, which is a plan view including the inflow port 21a and the outflow port 21b of the high-temperature side annular tube 21.

As shown in FIG. 4, the high-temperature side heat exchanger 2 includes the heat-exchanging honeycomb structure 20 that is fitted in a center hollow part of the annular shape of the high-temperature side annular tube 21. As indicated with thick arrows in FIG. 4, high-temperature heated fluid (e.g., high-temperature exhaust gas) flows into the high-temperature side annular tube 21 from the inflow port 21a on the lower side of the drawing and flows out from the outflow port 21b on the upper side of the drawing. At this time, as indicated with the arrows in FIG. 5, the high-temperature heated fluid flowing in through the inflow port 21a directly hits a circumferential wall 20b defining the circular circumference of the heat-exchanging honeycomb structure 20 and then is branched off into left and right two sides of the circumferential wall 20b and travels along the circumferential wall 20b. Then they join together at the outflow port 21b to flow out. In this way, the high-temperature heated fluid directly comes into contact with the circumferential wall 20b of the heat-exchanging honeycomb structure 20, whereby a lot of heat is directly transmitted from the high-temperature heated fluid to the circumferential wall 20b, and such heat is transmitted to the partition wall 20a in the heat-exchanging honeycomb structure 20 and the working fluid inside of the cells 20d as well. In this way, the heat-exchanging honeycomb structure 20 can directly come into contact with the high-temperature heated fluid because the heat-exchanging honeycomb structure 20 is made of a material having high heat resistance and good heat conductivity as described later, and such a direct contact with the heated fluid can suppress heat loss and improve heat-exchanging efficiency as compared with the case including another member intervening therebetween.

Although it is preferable that the heat-exchanging honeycomb structure 20 directly comes into contact with heated fluid in this way, the present invention may have a form in which, instead of such a direct contact of the circumferential wall 20b of the heat-exchanging honeycomb structure 20 with high-temperature heated fluid, the circumferential wall 20b is surrounded with metal. Especially when high-pressure gas (e.g., inert rare gas such as argon) is used as the working fluid to transmit acoustic waves, it is preferable to surround the circumferential wall 20b with metal from the viewpoint of hermetically sealing of such high-pressure gas and avoiding the leakage. In this case, the metal surrounding the circumferential wall 20b has a circumferential face, on which a metal fin (see fin 21e in FIG. 3, for example) is preferably provided so as to protrude in the outward direction (radial direction) from the center of the heat-exchanging honeycomb structure 20 of FIG. 5. This is to increase the contact area with the high-temperature heated fluid and improve heat-exchanging efficiency. If the contact area with the high-temperature heated fluid is small, exchange of heat between the high-temperature heated fluid and the high-temperature side heat exchanger 2 is not sufficient, and so the heat-exchanging efficiency of the high-temperature side heat exchanger 2 deteriorates. In this way, it is important for the high-temperature side heat exchanger 2 to maximize the contact area with the high-temperature heated fluid.

In a most preferable form, another honeycomb structure made of a ceramic material containing SiC (silicon carbide) as a main component is fitted in the tube of the high-temperature side annular tube. This is because such a ceramic material containing SiC (silicon carbide) as a main component has higher heat conductivity at high temperatures than that of metal fins, and the contact area with high-temperature gas also can be increased dramatically. Further, this can avoid a problem of erosion and deterioration due to high-temperature heated fluid, which can be a problem for metal fins. The following describes such a preferable form.

Figure 6:
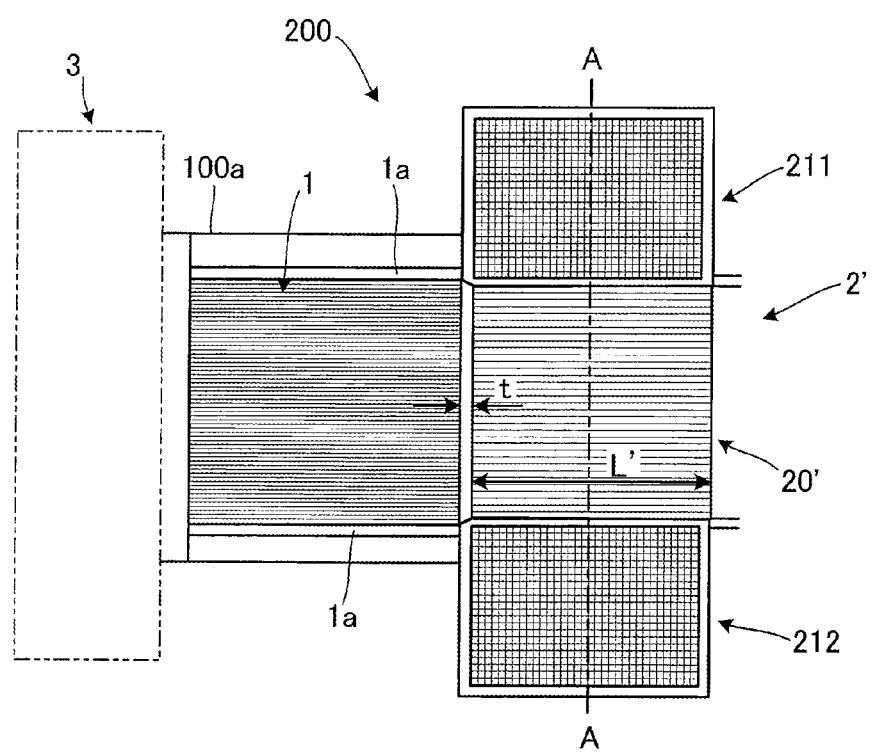
FIG. 6 schematically shows one form of a heat/acoustic wave conversion unit including another honeycomb structure fitted in the high-temperature side annular tube.
Figure 7:
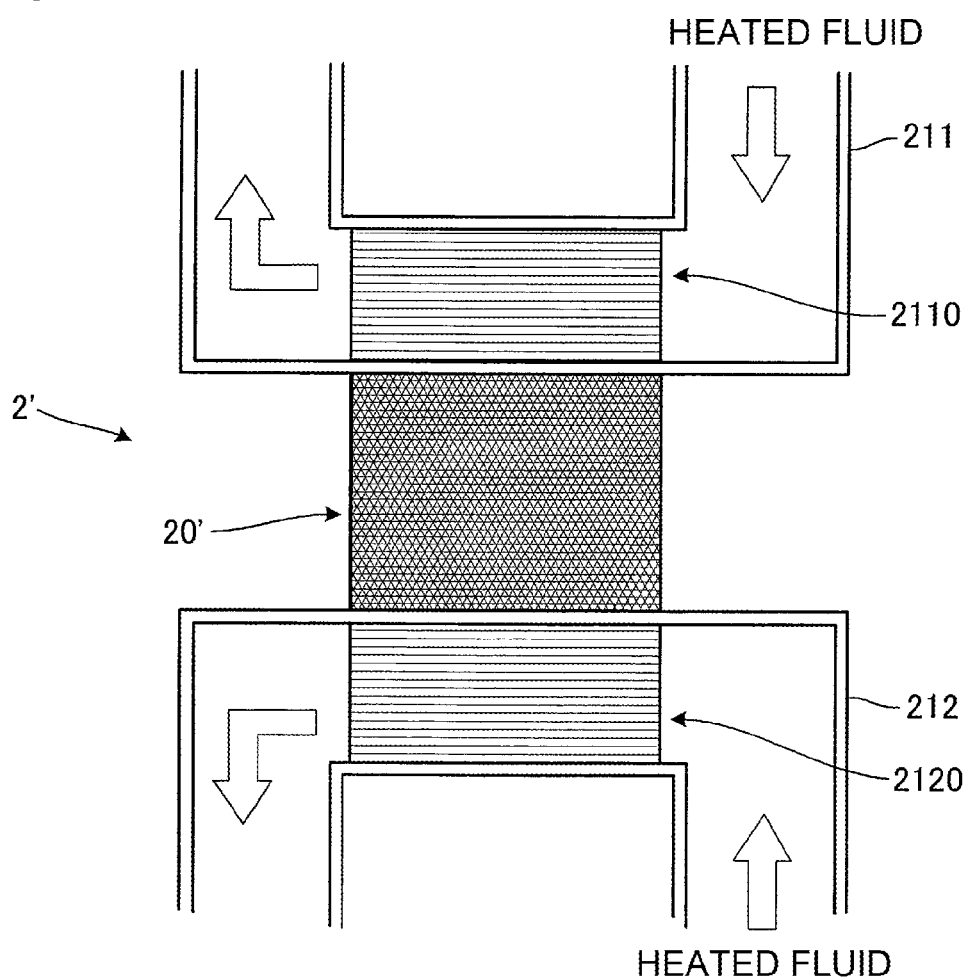
FIG. 7 is a schematic cross-sectional view of the high-temperature side heat exchanger taken along the line A-A of FIG. 6.

FIG. 6 schematically shows one form of a heat/acoustic wave conversion unit including another honeycomb structure fitted in the high-temperature side annular tube. FIG. 7 is a schematic cross-sectional view of the high-temperature side heat exchanger taken along the line A-A of FIG. 6.

In FIGS. 6 and 7, the same reference numerals are assigned to the same elements as those in FIGS. 3 to 5, and their duplicated descriptions are omitted.

A high-temperature side heat exchanger 2' in a heat/acoustic wave conversion unit 200 in FIG. 6 includes a heat-exchanging honeycomb structure 20' and two mutually different high-temperature side annular tubes 211 and 212. The heat-exchanging honeycomb structure 20' has a honeycomb structure including two or more cells penetrating horizontally in the drawing that are partitioned and defined by a partition wall, and transmits heat transmitted from heated fluid via the two different high-temperature side annular tubes 211 and 212 to the heat/acoustic wave conversion component 1. Herein, the heat-exchanging honeycomb structure 20' is disposed with a distance t from the heat/acoustic wave conversion component 1.

As shown in FIG. 7, the two high-temperature side annular tubes 211 and 212 internally include in-tube honeycomb structures 2110 and 2120, respectively, made of a ceramic material containing SiC (silicon carbide) as a main component. These in-tube honeycomb structures 2110 and 2120 both have a honeycomb structure including two or more cells penetrating horizontally in the drawing that are partitioned and defined by a partition wall. As shown in the arrows of the drawing, heated fluid flowing in the two high-temperature side annular tubes 211 and 212 passes through each cell of the in-tube honeycomb structures 2110 and 2120, and then flows out. At this time, heat of the heated fluid passing through each cell is transmitted to the in-tube honeycomb structures 2110 and 2120, and such heat is then transmitted to the heat-exchanging honeycomb structure 20' via the wall faces of the high-temperature side annular tubes 211, 212 and a metal tube (not shown) surrounding the side face (face of the circumferential wall) of the heat-exchanging honeycomb structure 20'. Although FIG. 7 shows the cross-section of the heat-exchanging honeycomb structure 20' as a rectangular shape for simplicity, it may have a circular cross section as in FIGS. 4 and 5, and a substantially similar configuration can be realized when the high-temperature side annular tubes 211 and 212 have a shape along the circle.

In this way, the circumferential wall of the heat-exchanging honeycomb structure 20' is surrounded with a metal tube, on an outside of which the two in-tube honeycomb structures 2110 and 2120 made of a ceramic material containing SiC (silicon carbide) as a main component are disposed. In this configuration, the heat-exchanging honeycomb structure 20' is not in a direct contact with the heated fluid, and so erosion and deterioration due to high-temperature heated fluid can be suppressed. When inert rare gas (e.g., argon) is used as the working fluid, a problem of erosion of the heat-exchanging honeycomb structure 20' due to working fluid does not happen. In this case, the heat-exchanging honeycomb structure 20' may be made of a metal material having good heat conductivity, such as copper, as well as a ceramic material containing SiC (silicon carbide) as a main component.

Herein, the heat-exchanging honeycomb structure 20' in FIG. 6 preferably has a length L' of the order of wavelength of acoustic waves generated from oscillations of the working fluid. If the length L' is too long with reference to the wavelength of acoustic waves, the heat given to the working fluid (e.g., inert rare gas) will be insufficient. If the length L' is too short with reference to the wavelength of acoustic waves, then working fluid may pass through the heat-exchanging honeycomb structure 20' from the outside and reach the heat/acoustic wave conversion component 1, and the working fluid at a relatively low temperature may cool the end of the heat/acoustic wave conversion component 1 on the high-temperature side heat exchanger side unfortunately.

Figure 8:
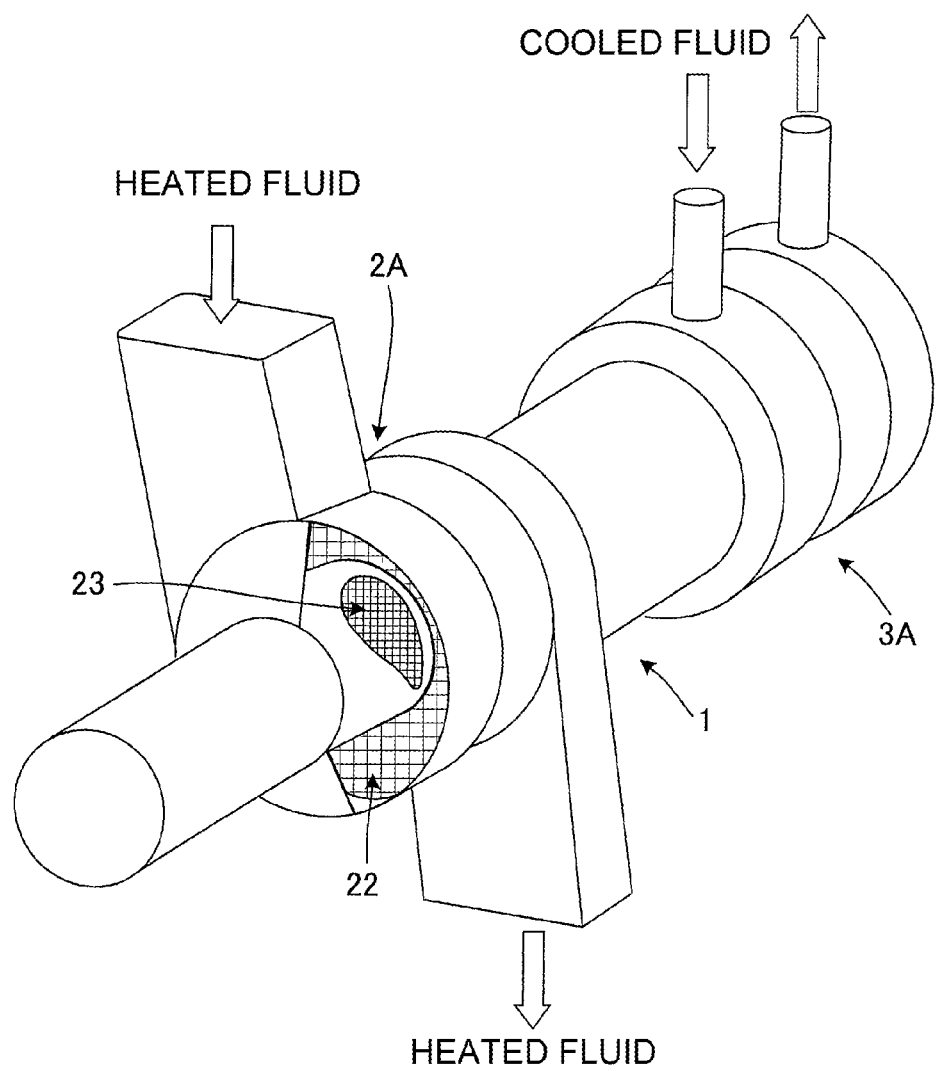
FIG. 8 schematically shows another form of the heat/acoustic wave conversion unit of the present invention that is different from the heat/acoustic wave conversion units in FIGS. 6 and 7.
Figure 9:
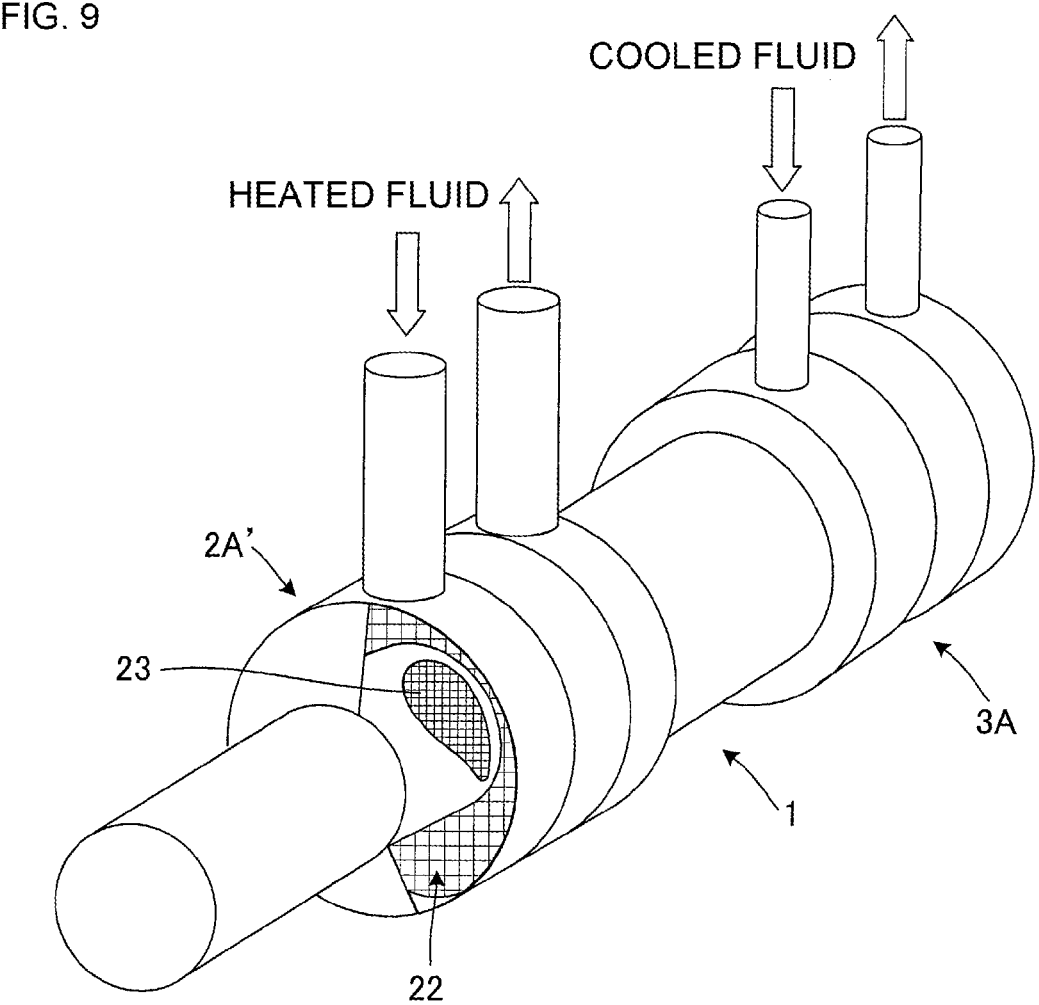
FIG. 9 schematically shows still another form of the heat/acoustic wave conversion unit that is different from the heat/acoustic wave conversion unit in FIG. 8.

FIG. 8 schematically shows another form of the heat/acoustic wave conversion unit of the present invention that is different from the heat/acoustic wave conversion units in FIGS. 6 and 7, and FIG. 9 schematically shows still another form of the heat/acoustic wave conversion unit that is different from the heat/acoustic wave conversion unit in FIG. 8.

In the heat/acoustic wave conversion unit of FIG. 8, heated fluid flows into the high-temperature side heat exchanger 2A from the upper side of the drawing and flows through the high-temperature side heat exchanger 2A, and then flows out toward the lower side of the drawing. On the other hand, in the heat/acoustic wave conversion unit of FIG. 9, heated fluid flows into the high-temperature side heat exchanger 2A' from the upper side of the drawing and flows through the high-temperature side heat exchanger 2A', and then flows out toward the upper side of the drawing. Herein in both of the heat/acoustic wave conversion units of FIGS. 8 and 9, cooled fluid flows into the low-temperature side heat exchanger 3A from the upper side of the drawing and flows through the low-temperature side heat exchanger 3A, and then flows out toward the upper side of the drawing. FIGS. 8 and 9 show the configuration partially as a perspective view to clarify the internal configurations (configuration including the following two honeycomb structures 22, 23).

The high-temperature side heat exchanger 2A in FIG. 8 and the high-temperature side heat exchanger 2A' in FIG. 9 include a pillar-shaped honeycomb structure 23 made of a metal material, and a hollow and round pillar-shaped (in other words, a cylindrical shape having a thickness) honeycomb structure 22 made of a ceramic material containing SiC (silicon carbide) as a main component surrounding the honeycomb structure. At the circumference of the honeycomb structure 23, a metal mesh outer tube 23a described later, which is made of the same metal material, is formed integrally with the metal honeycomb structure 23. To be precise, a metalized layer, which is described later, is present between the two honeycomb structures 22 and 23. These two honeycomb structures 22 and 23 both have a honeycomb structure including two or more round pillar-shaped cells penetrating in the elongated direction that are partitioned and defined by a partition wall. Such a configuration in FIGS. 8 and 9 also can suppress heat loss and improve heat conversion efficiency.

These embodiments have a honeycomb structure including the honeycomb structure 23 made of a metal material, and instead of this, a mesh structure made up of metal mesh may be used.

Figure 10:
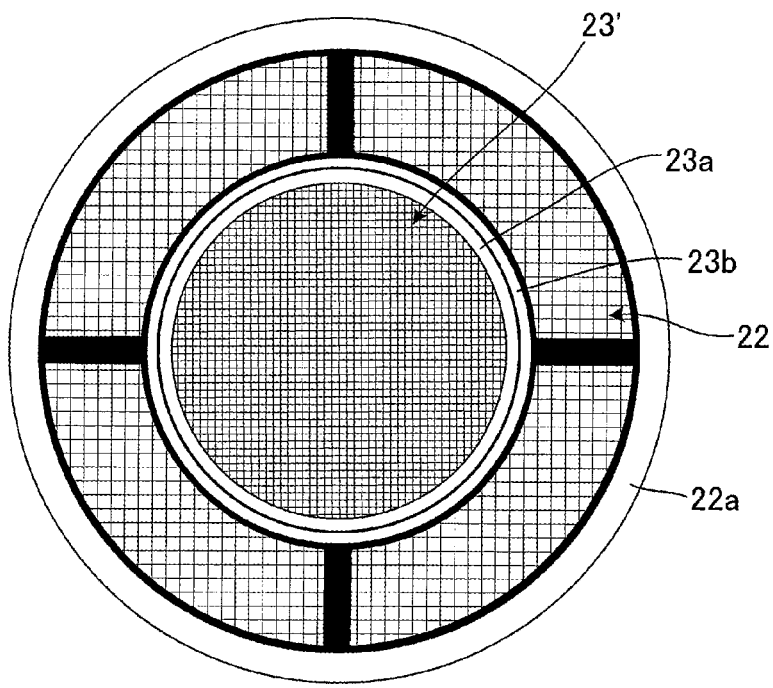
FIG. 10 is a cross-sectional view of a high-temperature side heat exchanger having a mesh structure.

FIG. 10 is a cross-sectional view of a high-temperature side heat exchanger having a mesh structure.

The high-temperature side heat exchanger in FIG. 10 includes, inside of the honeycomb structure 22 made of a ceramic material containing SiC (silicon carbide) as a main component that is surrounded with a metal outer tube 22a, a metal mesh member 23' via a cylindrical metalized layer 23b and a metal mesh outer tube 23a. Herein the metalized layer 23b is a layer formed by baking of metal such as molybdenum and manganese, which is a layer to bond the metal mesh outer tube 23a made of metal and the honeycomb structure 22 made of ceramic. The configuration in FIG. 10 also can suppress heat loss and improve heat-exchanging efficiency.

Referring back to FIGS. 3 to 5 again, the descriptions are continued in the following.

As shown in FIG. 3, the end face of the heat-exchanging honeycomb structure 20 on the heat/acoustic wave conversion component 1 side (the upper end face of the heat-exchanging honeycomb structure 20) is in a direct contact with the end face of the heat/acoustic wave conversion component 1 on the high-temperature side heat exchanger 2 side (the lower end face of the heat/acoustic wave conversion component 1). Hereinafter this upper end face of the heat-exchanging honeycomb structure 20 is called a contact face 20s. Instead of such a direct contact between the heat/acoustic wave conversion component 1 and the heat-exchanging honeycomb structure 20, gap t as in FIG. 6 may be present between the heat/acoustic wave conversion component 1 and the heat-exchanging honeycomb structure 20 in the present invention. In this case, heat transmitted to the heat-exchanging honeycomb structure 20 is transmitted to working fluid coming into contact with the heat-exchanging honeycomb structure 20, and the heated working fluid comes into contact with the vicinity of the end face of the heat/acoustic wave conversion component 1 due to displacement of the working fluid, which corresponds to oscillations of acoustic waves, to heat the vicinity of the end face. This allows the end of the heat/acoustic wave conversion component 1 on the high-temperature side heat exchanger 2 side to keep a relatively high-temperature state as compared with the end on the low-temperature side heat exchanger 3 side.

This heat-exchanging honeycomb structure 20 is made of a ceramic material containing SiC (silicon carbide) as a main component. Since a ceramic material has high heat resistance, such a material is suitable for the material of the heat-exchanging honeycomb structure 20 that directly comes into contact with high-temperature heated fluid as stated above. Further, since a ceramic material containing SiC (silicon carbide) as a main component has relatively good heat conductivity among other ceramic materials, such a material is suitable for a function to let the heat-exchanging honeycomb structure 20 transmit heat to the heat/acoustic wave conversion component 1 as stated above. Note here that "containing SiC (silicon carbide) as a main component" means that SiC accounts for 50 mass % or more of the material of the heat-exchanging honeycomb structure 20. At this time, the porosity is preferably 0 to 10%. It is then preferable that the thickness of the partition wall 20a is 0.25 to 0.51 mm and the cell density is 15 to 62 cells/cm$^2$.

Specific examples of the ceramic material containing SiC as a main component include simple SiC as well as Si impregnated SiC, (Si+Al) impregnated SiC, metal composite SiC, recrystallized SiC, Si$_3$N$_4$ and SiC. Among them, Si impregnated SiC and (Si+Al) impregnated SiC are preferable. This is because Si impregnated SiC has good heat conductivity and heat resistance, and has low porosity although it is a porous body and so is formed densely, and then it can realize relatively high strength as compared with SiC without impregnated Si.

As shown in FIG. 5, the heat-exchanging honeycomb structure 20 has a configuration of the triangle cells 20d that are arranged periodically with a period of a constant length in the plane perpendicular to the penetrating direction of the cells 20d. As described later, the heat/acoustic wave conversion component 1 to which heat is to be transmitted also has a similar configuration in the honeycomb segment described later that is a collective form of a plurality of cells 14, and the period of the cells 20d in the heat-exchanging honeycomb structure 20 is integral multiples of ten or more of the period of cells 14 in the heat/acoustic wave conversion component 1. In this way, the cells 20d of the heat-exchanging honeycomb structure 20 have the same shape as that of the cells 14 of the heat/acoustic wave conversion component 1 to which heat is to be transmitted, and the period of the cells 20d of the heat-exchanging honeycomb structure 20 is integral multiples of the period of the cells 14 of the heat/acoustic wave conversion component 1, whereby working fluid contained inside the cells 20d of the heat-exchanging honeycomb structure 20 and the cells 14 of the heat/acoustic wave conversion component 1 can move smoothly. The period of the cells of the heat-exchanging honeycomb structure 20 is larger than the period of the cells of the heat/acoustic wave conversion component 1 because the cells 14 of the heat/acoustic wave conversion component 1 are required to be very thin through holes to cause self-induced oscillations as stated above. On the other hand, there is no such a request for the cells 20d of the heat-exchanging honeycomb structure 20, and the heat-exchanging honeycomb structure 20 may play a role of heat exchange simply, and so the period of them is larger than the period of the cells 14 of the heat/acoustic wave conversion component 1 by one digit (ten times) or more.

Note here that preferably a honeycomb segment described later of the heat/acoustic wave conversion component 1 has a periodic arrangement with a period of a constant length, and the period of the cells of the heat-exchanging honeycomb structure 20 is preferably integral divisions of the period of this honeycomb segment (in other words, the period of this honeycomb segment is integral multiples of the period of the cells of the heat-exchanging honeycomb structure 20). This can suppress blocking of the cells of the heat-exchanging honeycomb structure 20 at a boundary with the neighboring honeycomb segments and so can suppress attenuation of acoustic waves. The integral multiples as stated above preferably are 5 to 20 times.

As shown in FIG. 3, the contact face 20s of the heat-exchanging honeycomb structure 20 with the heat/acoustic wave conversion component 1 is displaced toward the heat/acoustic wave conversion component 1 (upper side in the drawing) from a heat-receiving region 21c where the heat-exchanging honeycomb structure 20 directly comes into contact with high-temperature heated fluid to receive heat therefrom, and so does not overlap with the heat-receiving region 21c. If the contact face 20s overlaps with the heat-receiving region 21c, a temperature may differ greatly between the periphery of an edge of the contact face 20s closer to the heat-receiving region 21c and a center region away from the heat-receiving region 21c. In this case, the end (lower end in FIG. 3) of the heat/acoustic wave conversion component 1 on the heat-exchanging honeycomb structure 20 side is not heated uniformly, and so the cells of the heat/acoustic wave conversion component 1 cause non-uniform self-induced oscillations unfortunately. The heat-exchanging honeycomb structure 20 in FIG. 3 is configured so as not to overlap the contact face 20s with the heat-receiving region 21c to avoid such a problem.

As shown in FIG. 5, the heat-exchanging honeycomb structure 20 includes a slit 20c as a gap part of the circumferential wall 20b, the slit extending in the penetrating direction of the cells 20d. FIG. 5 shows the example of slits 20c formed at four positions of the circumferential face of the heat-exchanging honeycomb structure 20. Such slits 20c can mitigate thermal stress applied to the circumferential wall 20b when high-temperature heated fluid directly comes into contact with the circumferential wall 20b, which then can suppress breakage or peeling-off of the circumferential wall 20b and the partition wall 20a.

As shown in FIG. 5, the high-temperature side annular tube 21 is provided with four heat-resistant metal plates 21d along the extending direction of the slits 20c to fill the gaps at the slits 20c and extend. These four heat-resistant metal plates 21d can prevent working fluid from leaking into the high-temperature side annular tube 21 through the four slits 20c. Note here that the heat-exchanging honeycomb structure 20 is supported by fitting into these four heat-resistant metal plates 21d at an annular center part of the high-temperature side annular tube 21. These four heat-resistant metal plates 21d are provided with fins 21e (see FIG. 3 also) made of metal or ceramic containing SiC (silicon carbide) as a main component, the fins protruding outward (radial direction) from the center of the heat-exchanging honeycomb structure 20 in FIG. 5.

Next, the following describes the heat/acoustic wave conversion component 1 in FIG. 3 in details.

Figure 11:
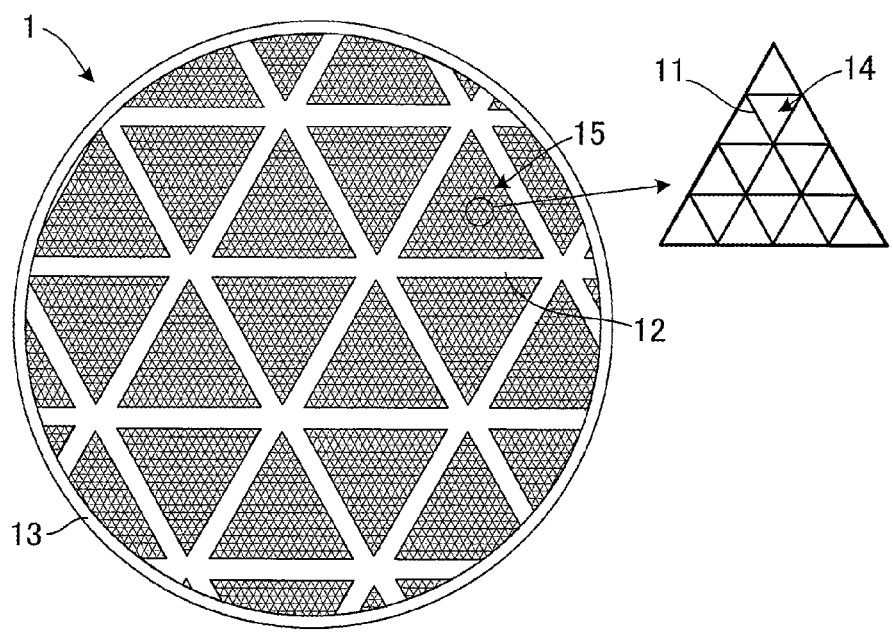
FIG. 11 is a cross-sectional view of the heat/acoustic wave conversion component of FIG. 3 in a plane perpendicular to the penetrating direction of the cells of the heat/acoustic wave conversion component.

FIG. 11 is a cross-sectional view of the heat/acoustic wave conversion component 1 in FIG. 3 in a plane perpendicular to the penetrating direction of the cells 14 of the heat/acoustic wave conversion component 1.

As shown in FIG. 11, the heat/acoustic wave conversion component 1 includes a plurality of honeycomb segments 15 each being a monolithic configuration, a bonding part 12 to bond the honeycomb segments 15 mutually, and a circumferential wall 13 that surrounds the circumference of the honeycomb structure body including these bonded members.

Each of the honeycomb segments 15 includes a plurality of cells 14, each being a thin-tube like through hole, that are partitioned and defined by a partition wall 11. As described above, hydraulic diameter HD of the cells 14 is one of the important factors to generate acoustic waves by self-induced oscillations, and so the hydraulic diameter HD of the cells 14 of each honeycomb segment in the heat/acoustic wave conversion component 1 has a very small value of 0.4 mm or less. Such cells with a very small hydraulic diameter HD can realize a sufficient thermoacoustic effect from the heat/acoustic wave conversion component 1. Conversely if the hydraulic diameter HD is larger than 0.4 mm, a very small thermoacoustic effect only can be realized, and then it becomes difficult to obtain sufficient amount of electric power and cold heat from the power generation system 1000 in FIG. 1 and the cold heat generation system 2000 in FIG. 2.

Herein, for a larger thermoacoustic effect, it is advantageous to form as many as possible of the cells having a small hydraulic diameter as stated above. In other words, it is advantageous to have a larger open frontal area at the end faces of the honeycomb segments 15. Then, the heat/acoustic wave conversion component 1 includes each honeycomb segment having an open frontal area of 60% or more, from which a larger thermoacoustic effect can be obtained. If the open frontal area is less than 60%, the number of cells contributing to the thermoacoustic effect is too small, and so a very large thermoacoustic effect cannot be achieved therefrom.

Herein, if the open frontal area is too large, this means too many hollows in each honeycomb segment, and so durability of each honeycomb segment and accordingly of the heat/acoustic wave conversion component 1 as a whole deteriorates. Then the open frontal area at the honeycomb segments 15 is suppressed to be 93% or less. Actually if the open frontal area exceeds 93%, damage of the honeycomb segments 15 due to thermal distortion and twisting (thermal stress described later) resulting from impacts of generated acoustic waves and a temperature difference at both ends of the honeycomb segments cannot be ignored.

In this way, the open frontal area at the end faces of each honeycomb segment in the heat/acoustic wave conversion component 1 that is 60% or more and 93% or less can achieve adequate balance between a sufficient thermoacoustic effect and sufficient durability. The open frontal area of 80% or more and 93% or less is preferable in the open frontal area of 60% or more and 93% or less.

The open frontal area can be obtained by taking an image of a cross section perpendicular to the penetrating direction by a microscope, and determining the material-part area S1 and the gap-part area S2 from the taken image of the cross section. Then the open frontal area can be obtained as $S2/(S1+S2)$ based on S1 and S2.

The material making up of each honeycomb segment in the heat/acoustic wave conversion component 1 has low heat conductivity of 5 W/mK or less. If the heat conductivity is larger than 5 W/mK, heat is transmitted through the partition wall 11 from the high-temperature side heat exchanger 2 side to the low-temperature side heat exchanger 3 side in each honeycomb segment before heat exchange between the working fluid in each cell and the partition wall 11 becomes sufficient. As a result, a sufficient thermoacoustic effect may not be obtained. On the other hand, such low heat conductivity of 5 W/mK or less leads to sufficient heat exchange between the working fluid in each cell and the partition wall 11, and so a sufficient thermoacoustic effect can be obtained. Heat conductivity of 1.5 W/mK or less is preferable in the heat conductive of 5 W/mK or less. If the heat conductivity is too small, then the end face of the heat/acoustic wave conversion component 1 on the high-temperature side heat exchanger 2 side only has a high temperature locally, meaning a failure to transmit heat to the wall face in the cells and so the difficulty to generate a thermoacoustic effect. Then, heat conductivity of at least 0.01 W/mK is preferable.

The heat conductivity can be obtained by a temperature gradient method (steady method). Specifically, the heat conductivity can be obtained as follows. Firstly, a plate-shaped test sample is cut out from a target for the heat conductivity measurement, and such a plate-shaped test sample is sandwiched between spacers whose heat conductivity is known (e.g., made of metals, such as copper and stainless steel). Then, one side thereof is heated to 30° C. to 200° C., and the other side is cooled to 20 to 25° C., whereby a certain temperature difference is given in the thickness direction of the test sample. Then, the heat flow rate transmitted is obtained by the temperature gradient in the spacers, and this heat flow rate is divided by the temperature difference to calculate the heat conductivity.

Let that L denotes the length between both end faces of the honeycomb segment 15, the honeycomb segment 15 has a ratio HD/L of the hydraulic diameter HD as stated above to the length L that is 0.005 or more and less than 0.02. If HD/L is less than 0.005, the honeycomb segment 15 is too long as compared with the hydraulic diameter HD. Then working fluid in each cell of the honeycomb segment 15 will be less affected from a temperature difference between both ends of the honeycomb segments. In this case, heat exchange between the working fluid in each cell and the partition wall 11 is not sufficient and so a sufficient thermoacoustic effect cannot be obtained. On the other hand, if HD/L is 0.02 or more, then the honeycomb segment 15 is too short as compared with the hydraulic diameter HD. In this case, heat is transmitted through the partition wall 11 from the high-temperature side heat exchanger 2 side to the low-temperature side heat exchanger 3 side in each honeycomb segment before heat exchange between the working fluid in each cell and the partition wall 11 becomes sufficient. As a result, a sufficient thermoacoustic effect still cannot be obtained. Then, the heat/acoustic wave conversion component 1 is configured to have the ratio HD/L of 0.005 or more and less than 0.02 in each honeycomb segment, and so heat exchange between the working fluid in each cell and the partition wall 11 is sufficient. As a result, the heat/acoustic wave conversion component 1 can have a sufficient thermoacoustic effect.

The heat/acoustic wave conversion component 1 has a bonding structure in which the honeycomb segments 15 are mutually bonded with the bonding part 12 as shown in FIG. 11, whereby the bonding part 12 can exert a buffer effect to thermal stress. When heating and cooling are performed at both ends of the heat/acoustic wave conversion component 1 by the high-temperature side heat exchanger 2 and the low-temperature side heat exchanger 3 of FIG. 3, then thermal stress resulting from a difference in the amount of thermal expansion between the both ends typically acts on the heat/acoustic wave conversion component 1. Such a bonding structure allows the bonding part 12 to generate an elastic force against such thermal stress while deforming elastically to some extent and weakening the thermal stress (buffer effect). Then thermal stress acts less directly on the honeycomb segments 15 themselves, and so damage on the honeycomb segments 15, and accordingly on the heat/acoustic wave conversion component 1 as a whole can be suppressed.

In the heat/acoustic wave conversion component of the present invention, each honeycomb segment may include cells 14 having a shape in a plane perpendicular to the penetrating direction of the cells that are various polygons, such as triangles, quadrangles, pentagons and hexagons as well as ellipses (including a perfect circle shape), where triangles, quadrangles and hexagons and their combinations are preferable. As shown in the enlarged view on the upper right side of the heat/acoustic wave conversion component 1 in FIG. 11 showing the arrangement of the cells 14, it is particularly preferable to arrange triangle cells 14 periodically in such a perpendicular plane.

Such triangular cells 14 are particularly preferable because, among various polygonal shapes and elliptical cell shapes, triangular cell shapes are the most suitable for the arrangement of a lot of cells while minimizing the thickness of the partition wall. Note here that, in the case of a honeycomb structure to load catalyst for exhaust purification to remove fine particles from exhaust gas of automobiles, if their cells have corners at acute angles, fine particles easily accumulate at the corners unfortunately. Then, such a honeycomb structure practically does not have triangular cell shapes in many cases, although it can have such a shape in principle. On the other hand, in the case of a honeycomb structure (honeycomb segment) to exert a thermoacoustic effect, such a problem does not happen to working fluid (gas such as rare gas) causing self-induced oscillations, and so triangular cell shapes, which are the most suitable to arrange a lot of cells, can be used positively.

Meanwhile, a honeycomb segment of the present invention favorably has the same shape as that of the cells so that the shape of the cells is directly reflected, because the honeycomb segment is a collective form of a plurality of cells, and from the viewpoint of arranging as many as possible of cells on the cross section of the heat/acoustic wave conversion component as a whole. For instance, when the cells 14 have a triangular shape as in FIG. 11, then the honeycomb segments 15 also have a triangular shape so that the shape of the cells 14 is directly reflected. FIG. 11 shows the state where triangle honeycomb segments 15 are periodically arranged in a plane of FIG. 11 at a part other than the vicinity of the circumferential wall 13 of the heat/acoustic wave conversion component 1.

Herein, when the cells 14 have a triangular shape, the honeycomb segments may have a hexagonal shape other than a triangular shape. This is because a hexagon can be made up of six triangles.

Figure 12:
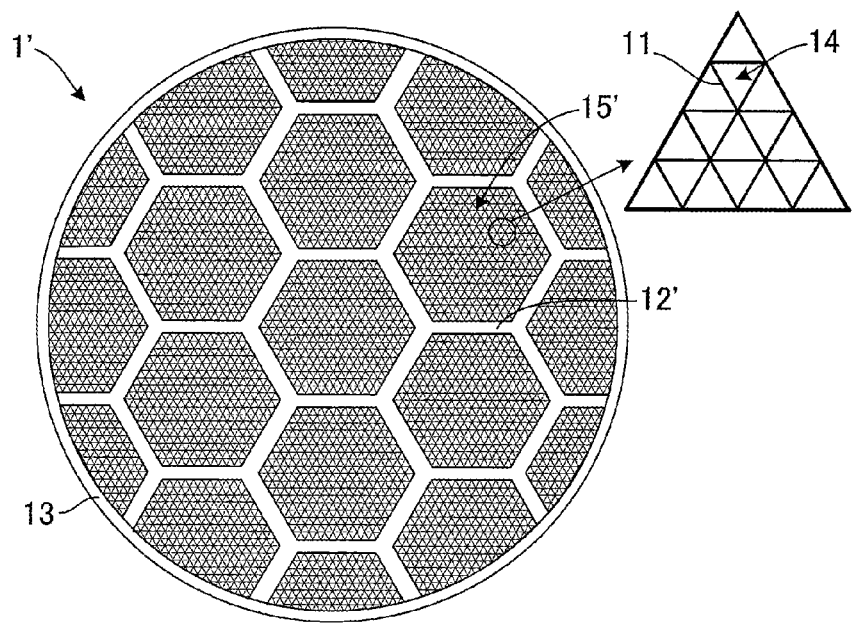
FIG. 12 shows an example where cells have a triangular shape, and honeycomb segments have a hexagonal shape.

FIG. 12 shows an example where cells have a triangular shape, and honeycomb segments have a hexagonal shape.

In FIG. 12, the same reference numerals are assigned to the same elements as those in FIG. 11, and their duplicated descriptions are omitted.

In the heat/acoustic wave conversion component 1' of FIG. 12, as is understood from the arrangement of cells 14 that is indicated on the upper right side of FIG. 12 as an enlarged view, triangular cells 14 are periodically arranged in a plane perpendicular to the penetrating direction of the cells 14 in a honeycomb segment 15'. This honeycomb segment 15' has a hexagonal shape, and a plurality of these hexagonal honeycomb segments 15' are periodically arranged in a plane of FIG. 11 at a part other than the vicinity of the circumferential wall 13 of the heat/acoustic wave conversion component P. Such a form also enables as many as possible of cells to be arranged on the cross section of the heat/acoustic wave conversion component 1' as a whole.

Referring back to FIG. 11, the following continues the description of the heat/acoustic wave conversion component 1 in FIG. 11. The properties of the heat/acoustic wave conversion component 1 described below are common to the heat/acoustic wave conversion component 1' in FIG. 12 as well.

Preferably in the heat/acoustic wave conversion component 1 in FIG. 11, both of the materials making up the bonding part 12 and the circumferential wall 13 as stated above have a Young's modulus that is less than 30% of the Young's modulus of the material making up the honeycomb segments 15, and the material making up the bonding part 12 has a thermal expansion coefficient that is 70% or more and less than 130% of the thermal expansion coefficient of the material making up the honeycomb segments 15. Then, the material making up the bonding part 12 has heat capacity per unit volume that is 50% or more of the heat capacity per unit volume of the material making up the honeycomb segments 15.

Such Young's modulus of the materials making up the bonding part 12 and the circumferential wall 13 that is less than 30% of the Young's modulus of the material making up the honeycomb segments 15 leads to a sufficient buffer effect to the thermal stress as stated above. At this time, if the thermal expansion coefficient and the heat capacity per unit volume of the bonding part 12 and the circumferential wall 13 differ greatly from the thermal expansion coefficient and the heat capacity per unit volume of the material making up the honeycomb segments 15 due to a difference in materials, then a problem such as peeling-off occurs between the bonding part 12 or the circumferential wall 13 and the honeycomb segments 15, and then durability against thermal stress may be degraded in this case also. Then the thermal expansion coefficient and the heat capacity per unit volume of the bonding part 12 and the circumferential wall 13 within the aforementioned numerical range can lead to sufficient durability against thermal stress.

The Young's modulus is calculated in the following way. Firstly, a plate-shaped sample having predetermined dimensions is cut out for each material. The dimensions are those for a plate having a square-shaped face belonging to the range of 10×10 mm to 30×30 mm and a thickness belonging to the range of 0.5 to 3 mm, which is common to these materials. Let that S denotes the area of the plate-shaped sample (mm$^2$) and t denotes the thickness (mm), then variations Δt (mm) in the thickness of the sample is measured when load W (N) belonging to the range of 0 to 3 MPa is applied to the face of the plate-shaped sample. This load W also is common to these materials. Then, the Young's module is calculated by the expression E=(W/S)×(t/Δt), where E denotes the Young's modulus. Especially in order to find the Young's modulus for the material of the honeycomb segments 15, firstly the Young's modulus is measured for a sample having a honeycomb structure as stated above, and then the measured Young's modulus is converted into the Young's modulus of the material making up the honeycomb segments 15 (i.e., the Young's modulus as the material property of the honeycomb segments 15 that is irrespective of the honeycomb structure) considering the honeycomb structure.

The thermal expansion coefficient can be obtained pursuant to the "measurement method of thermal expansion of fine ceramics by thermo-mechanical analysis" that is described in JIS R1618-2002. In this measurement, a rod-shaped member having the size specified in JIS R1618-2002 is cut out from the honeycomb segments 15 so that the length direction of a rod-shaped member to be measured specified in JIS R1618-2002 agrees with the penetrating direction of the cells of the honeycomb segments 15, and then the thermal expansion coefficient is obtained by the method specified in JIS R1618-2002. The thus obtained thermal expansion coefficient can be used as a thermal expansion coefficient of the material in the direction agreeing with the cell penetrating direction.

The heat capacity per unit volume (e.g., 1 cc) can be obtained as follows. Firstly, a part of the measurement target is pulverized to be a powder form. Then such a powder-form target is used as a sample, and then a relationship between input heat and temperature rise of the sample is examined using an adiabatic calorimeter. In this way, the heat capacity per unit volume of the sample can be obtained. Then, the thus obtained heat capacity per unit volume is multiplied by density (mass per unit volume) of the measurement target used as the sample before pulverization, whereby the heat capacity per unit volume (e.g., 1 cc) can be obtained.

Herein the honeycomb segments 15 preferably include, as a main component, one or two or more in combination of cordierite, mullite, aluminum titanate, alumina, silicon nitride, silicon carbide, and heat resistance resins. Containing "as a main component" means that the material accounts for 50 mass % or more of the honeycomb segments 15. Meanwhile, the bonding part 12 and the circumferential wall 13 are preferably prepared by using a coating material including inorganic particles and colloidal oxide as a bonding material and an outer coating material to form and the circumferential wall. Exemplary inorganic particles include particles made of a ceramic material containing one or two or more in combination of cordierite, alumina, aluminum titanate, silicon carbide, silicon nitride, mullite, zirconia, zirconium phosphate and titania, or particles of Fe—Cr—Al-based metal, nickel-based metal and silicon(metal silicon)-silicon carbide based composite materials. Exemplary colloidal oxide includes silica sol and alumina sol.

Preferably in the heat/acoustic wave conversion component 1 of FIG. 11, the bonding width of two honeycomb segments 15 mutually bonded is 0.2 mm or more and 4 mm or less, and the ratio of the total cross-sectional area of the bonding part 12 to the cross-sectional area of the heat/acoustic wave conversion component 1 in a plane perpendicular to the penetrating direction of the cells 14 is 10% or less.

Such a bonding width of two honeycomb segments 15 mutually bonded and ratio of the total cross-sectional area of the bonding part 12 to the cross-sectional area of the heat/acoustic wave conversion component 1 in these numerical ranges can lead to sufficient durability against thermal stress while suppressing a decrease in thermoacoustic effect, resulting from a decrease in open frontal area due to the bonding part 12.

In the heat/acoustic wave conversion component 1, each of the plurality of honeycomb segments 15 preferably has a cross-sectional area in a plane perpendicular to the penetrating direction of the cells 14 that is 3 cm$^2$ or more and 12 cm$^2$ or less.

Such a cross-sectional area of each honeycomb segment in the above-stated numerical range can lead to adequate balance between sufficient thermoacoustic effect achieved and sufficient durability.

In the heat/acoustic wave conversion component 1, preferably a cross section of the heat/acoustic wave conversion component 1 in a plane perpendicular to the penetrating direction of the cells 14 has an equivalent circle diameter D of 30 mm or more and 100 mm or less, and the ratio L/D of the length L of the honeycomb segment 15 to the equivalent circle diameter D is 0.3 or more and 1.0 or less.

The "equivalent circle diameter" is defined as D in the representation of the cross-sectional area of the heat/acoustic wave conversion component 1 as $\pi D^2/4$. The ratio L/D of the length L of the honeycomb segment 15 to the equivalent circle diameter D in the numerical range of 30 mm or more and 100 mm or less may be 0.3 or more and 1.0 or less, whereby a heat/acoustic wave conversion component having a sufficient thermoacoustic effect and an adequate size can be realized.

Preferably the material making up the honeycomb segments 15 in the heat/acoustic wave conversion component 1 has a ratio of thermal expansion at 20 to 800° C. that is 6 ppm/K or less.

Such a ratio of thermal expansion at 20 to 800° C. of 6 ppm/K or less of the material making up the honeycomb segments 15 can suppress damage on the honeycomb segments 15 when a temperature difference occurs at the both ends, and accordingly suppress damage on the heat/acoustic wave conversion component 1. A ratio of thermal expansion of 4 ppm/K or less is more preferable in the ratio of thermal expansion of 6 ppm/K or less.

Preferably the heat/acoustic wave conversion component 1 has a length L of the honeycomb segments 15 that is 5 mm or more and 60 mm or less.

Each of the honeycomb segments having a cross sectional area in the aforementioned numerical range can achieve a sufficient thermoacoustic effect.

The following describes a method for manufacturing the heat/acoustic wave conversion component 1. The following describes the case where the honeycomb segments 15 are made of a ceramic material.

Firstly, binder, surfactant, pore former, water and the like are added to a ceramic raw material to prepare a forming raw material. The ceramic raw material preferably includes one or two or more in combination of a cordierite forming raw material, a silicon carbide-cordierite based composite material, aluminum titanate, silicon carbide, a silicon-silicon carbide based composite material, alumina, mullite, spinel, lithium aluminum silicate, and Fe—Cr—Al based alloy. Among them, a cordierite forming raw material is preferable. Herein the cordierite forming raw material is a ceramic raw material formulated to have a chemical composition in the range of 42 to 56 mass % of silica, 30 to 45 mass % of alumina and 12 to 16 mass % of magnesia, and forms cordierite after firing. The ceramic raw material preferably is contained to be 40 to 90 mass % with reference to the forming raw material as a whole.

Exemplary binder includes methyl cellulose, hydroxypropoxyl cellulose, hydroxyethylcellulose, carboxymethylcellulose, or polyvinyl alcohol. Among them, methyl cellulose and hydroxypropyl cellulose are preferably used together. The content of the binder is preferably 2 to 20 mass % with reference to the forming raw material as a whole.

The content of water is preferably 7 to 45 mass % with reference to the forming raw material as a whole.

Exemplary surfactant used includes ethylene glycol, dextrin, fatty acid soap, or polyalcohol. They may be used alone or in combination of two or more types. The content of the surfactant is preferably 5 mass % or less with reference to the forming raw material as a whole.

The pore former is not limited especially as long as it forms pores by firing. Exemplary pore former includes starch, foamable resin, water absorbable resin or silica gel. The content of the pore former is preferably 15 mass % or less with reference to the forming raw material as a whole.

Next, a kneaded material is prepared by kneading the forming raw material. A method for preparing a kneaded material by kneading the forming raw material is not limited especially. For instance, a kneader or a vacuum pugmill may be used for this purpose.

Next, the kneaded material is extruded, whereby a plurality of honeycomb formed bodies are prepared, including a partition wall defining a plurality of cells. For the extrusion, a die having a shape in accordance with the hydraulic diameter of each cell, the open frontal area, the shape of the honeycomb segments, the cell shape, and the period of the cells as stated above is preferably used. A preferable material of the die is cemented carbide having wear resistance. Values of the hydraulic diameter of each cell, the open frontal area, or the like of each honeycomb formed body are determined, preferably while considering contraction generated during drying and firing described later as well.

Herein the honeycomb segments 15 having a very small hydraulic diameter of each cell and having a large open frontal area (having large cell density) as stated above to exert a larger thermoacoustic effect cannot be manufactured by simply using an extrusion method as it is (i.e., by simply executing a similar manufacturing method using a different die to form high-density pores) that is used for a conventional honeycomb structure to load catalyst for exhaust purification, which is free from such constraints, due to the following two problems.

The first problem is that, during extrusion, kneaded material extruded at a high temperature adheres to the holes in a forming die, which easily generates clogging. This problem is mentioned by Patent Document 3 also in paragraph [0021].

The second problem is that a die used for a honeycomb structure as in the honeycomb segments 15 having a very small hydraulic diameter of each cell and having a large open frontal area (having large cell density) inevitably includes a very thin and minute part (typically a part of about 0.3 mm in thickness). Then, such a minute part often is damaged (e.g., is torn) by viscous friction during kneaded material extrusion.

Then, the manufacturing method of the heat/acoustic wave conversion component 1 has the following configuration to solve these two problems.

For the first problem, prior to the extrusion using a die (hereinafter called a real die) corresponding to the honeycomb segments 15 having the hydraulic diameter of each cell that is 0.4 mm or less and the open frontal area that is 60% or more and 93% or less, i.e., having a very small hydraulic diameter of each cell and having a large open frontal area (having large cell density), a kneaded material is extruded using another die (hereinafter called a dummy die) having a very small thickness of ribs that is 0.04 mm or more and 0.09 mm or less. The "thickness of ribs" here refers to the thickness of the partition wall of the honeycomb formed body, and means a slit width of the die. Each slit is a hole to discharge the kneaded material and is to determine the shape of each partition wall part at the honeycomb structure to be manufactured. In the following, the "thickness of ribs" means the slit width. The extrusion using such a dummy die can remove beforehand the component of the kneaded material that tends to be a cause of the clogging. Then extrusion by a real die is performed for the kneaded material subjected to the extrusion, whereby clogging as stated above can be suppressed.

The second problem is solved by reducing viscosity of the kneaded material used for extrusion greatly as compared with the viscosity of a kneaded material used for a conventional honeycomb structure to load catalyst for exhaust purification so as to reduce the viscous friction while keeping the range of a shape-holding property (i.e. the shape of the formed body is not distorted) of the formed body of the honeycomb segments 15 during extrusion. To reduce the viscosity of kneaded material while satisfying the condition to keep a shape-holding property in this way, the ratio of water in the kneaded material has to be more strictly controlled than in the manufacturing of a conventional honeycomb structure to load catalyst for exhaust purification (i.e., keeping an error between the control target of the water ratio and the actual water ratio in a very narrow range). Specifically, the ratio of water in the kneaded material is 40 to 42 parts by mass with reference to 100 parts by mass of the kneaded material solid component that is used to manufacture the honeycomb segments 15, while the ratio of water in the kneaded material is 25 to 35 parts by mass with reference to 100 parts by mass of the kneaded material solid component that is used to manufacture a conventional honeycomb structure to load catalyst for exhaust purification. When the ratio of water in the kneaded material increases, then viscosity of the kneaded material decreases and adequate fluctuations occur in the shape of the formed body of the honeycomb segments 15. This leads to another advantageous effect that self-induced oscillations of acoustic waves likely occur.

The following describes a die that is used to prepare a honeycomb formed body (i.e., extrusion) in the present embodiment. For ease of explanation, the following mainly describes the case where cells have a quadrangular shape.

Figure 13:
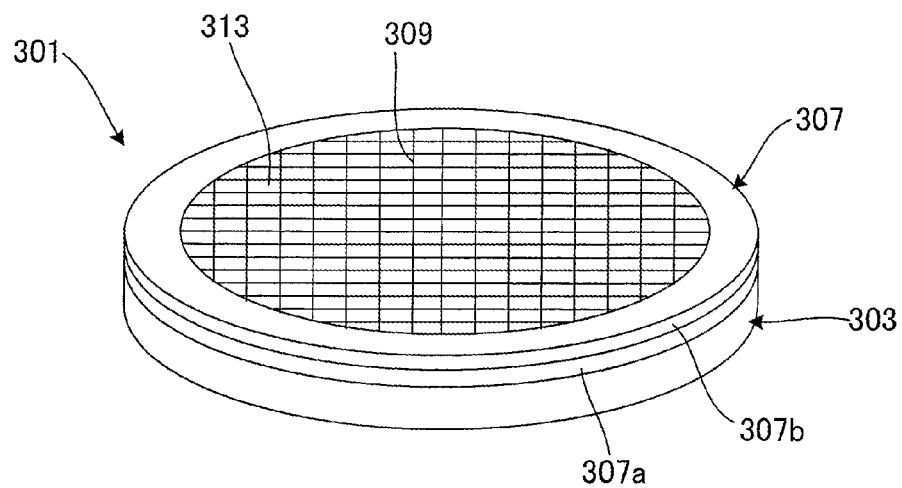
FIG. 13 is a perspective view showing the appearance of a die that is used to prepare a honeycomb formed body in the present embodiment.
Figure 14:
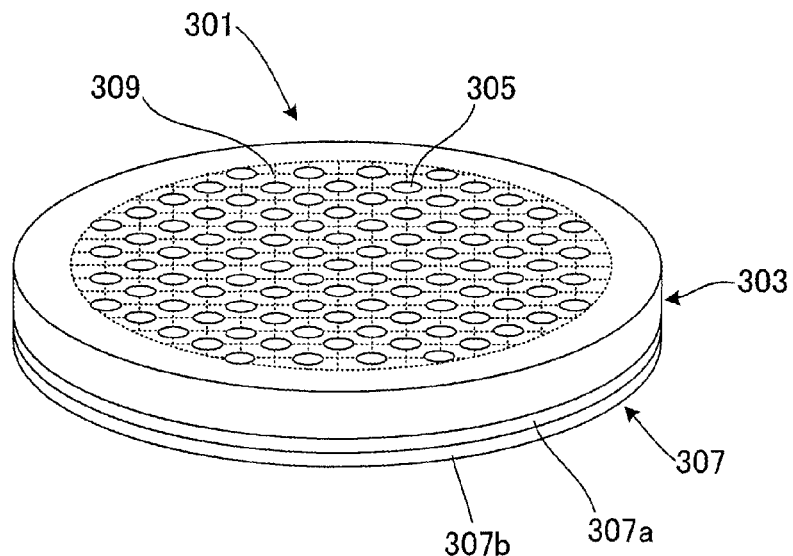
FIG. 14 is a perspective view showing the appearance of the die in FIG. 13 that is viewed from the opposite side of FIG. 13.
Figure 15:
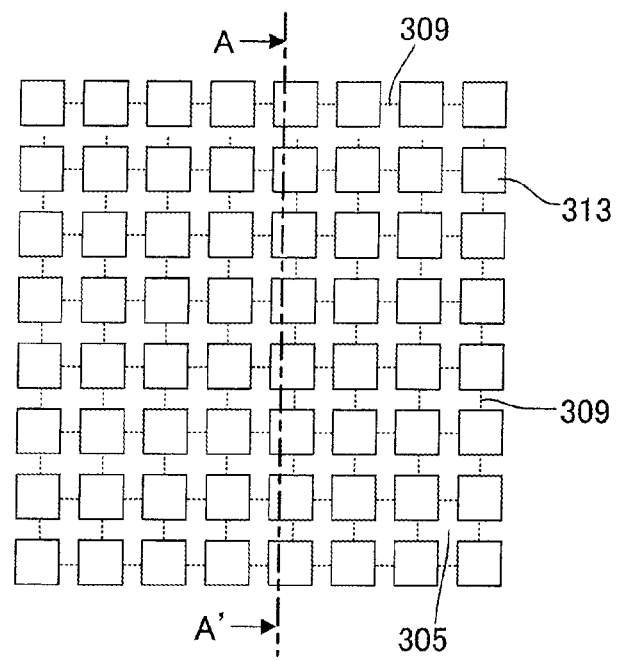
FIG. 15 is an enlarged plan view showing a part of the surface of the die in FIG. 13.

FIG. 13 is a perspective view showing the appearance of a die that is used to prepare a honeycomb formed body in the present embodiment, and FIG. 14 is a perspective view showing the appearance of the die in FIG. 13 that is viewed from the opposite side of FIG. 13. FIG. 15 is an enlarged plan view showing a part of the surface of the die in FIG. 13, and FIG. 16 schematically shows a cross section of the die of FIG. 15 taken along the line A-A'.

Figure 16:
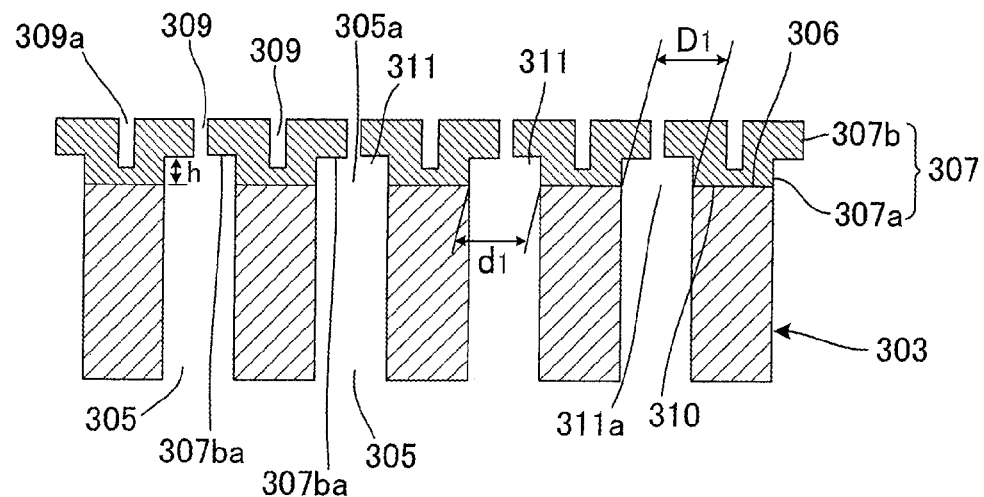
FIG. 16 schematically shows a cross section of the die of FIG. 15 taken along the line A-A'.

As shown in FIGS. 13 to 16, a die 301 includes a second plate-shaped part 303, and a first plate-shaped part 307 made of tungsten carbide based cemented carbide. Herein the second plate-shaped part 303 is made of at least one type selected from the group consisting of iron, steel materials, aluminum alloy, copper alloy, titanium alloy and nickel alloy, and this second plate-shaped part 303 includes a back hole 305 to introduce the forming raw material of the honeycomb formed body. The first plate-shaped part 307 includes a hole part 311 that is in communication with the back hole 305, and also includes a slit 309 that is in communication with the hole part 311 and defines a cell block 313. This first plate-shaped part 307 includes a first layer 307a disposed on the second plate-shaped part 303 side and a second layer 307b disposed on the first layer 307a. Herein, the hole part 311 is open at both of the faces of the first layer 307a, and the slit 309 is open at both of the faces of the second layer 307b. FIG. 16 shows the state where the hole part 311 has an open end 311a at a first bonding face 310 that agrees with an open end 305a of the back hole 305 at the second bonding face. Such a configuration of the die 301 is to lengthen the life of the die as described later.

The die 301 preferably has a thickness of 4 to 10 mm. If the thickness is less than 4 mm, the die may be broken during forming. If the thickness is more than 10 mm, pressure loss is high during forming of a honeycomb structure, meaning difficulty in forming in some cases.

The second plate-shaped part 303 includes a plate-shaped member made of at least one type selected from the group consisting of iron, steel materials, aluminum alloy, copper alloy, titanium alloy and nickel alloy. Herein steel materials are at least one type selected from the group consisting of stainless steel, dies steel and high-speed steel. Among these materials, steel materials are preferable as the material of the second plate-shaped part 303, and stainless steel is more preferable.

In the present application, "at least one type selected from the group consisting of iron, steel materials, aluminum alloy, copper alloy, titanium alloy and nickel alloy" may be referred to as "free-machining material". The free-machining material is a material that can be easily ground as compared with tungsten carbide based cemented carbide. Since the second plate-shaped part 303 does not include the slit 309, wearing is less problematic in the second plate-shaped part 303 than in the first plate-shaped part 307. Since the second plate-shaped part 303 is made of free-machining material, the second plate-shaped part 303 has excellent workability as compared with tungsten carbide based cemented carbide. Further the cost for free-machining material is lower than that of the tungsten carbide based cemented carbide, and so the manufacturing cost can be reduced.

Stainless steel that is one type of the materials available as the second plate-shaped part 303 may be well-known stainless steel. For instance, it may be SUS304, SUS303 and the like. The size of the second plate-shaped part 303 is not limited especially, and it may have a desired size depending on the purpose. Herein when the second plate-shaped part 303 has a circular plate shape, the diameter of the circular plate (diameters of one face and the other face) is preferably 20 to 40 mm. The thickness of the second plate-shaped part 303 is preferably 2 to 8 mm. If the thickness is less than 2 mm, it may generate deformation and breakage due to stress from forming resistance, and if the thickness is more than 8 mm, forming resistance is excessive, meaning difficulty in extrusion of the formed body.

As described above, the second plate-shaped part 303 includes the back hole 305 to introduce the forming raw material, and the back hole 305 is a through hole (a hole that is open at both faces of the second plate-shaped part 303) to introduce the forming raw material. When the honeycomb structure is formed using this die 301, the forming raw material for the honeycomb structure is introduced from the back hole 305. The back hole 305 may have any shape as long as it can guide the introduced forming raw material to the hole part 311 and the slit 309, and the back hole 305 preferably has a circular shape in a cross section orthogonal to the flowing direction of the forming raw material (thickness direction of the second plate-shaped part). The open end of the back hole 305 preferably has a diameter of 0.15 to 0.45 mm, where 0.25 to 0.40 mm is more preferable. Such a back hole 305 can be formed by machine processing, such as electrochemical machining (ECM), electrical discharge machining (EDM), laser processing and drill processing, for example. Among these methods, electrochemical machining (ECM) is preferable because ECM can form the back hole 305 effectively and precisely. The space in the back hole is preferably in a round-pillar shape. In this case, the diameter (diameter of the back hole) in a cross section orthogonal to the flowing direction of the forming raw material (thickness direction of the second plate-shaped part) in the back hole can have a constant value. In this case, the diameter of the back hole is equal to the diameter of the open end of the back hole at the second bonding face. The number of back holes is not limited especially, which can be decided appropriately depending on the shape of the honeycomb structure to be manufactured, for example. When the cells have a triangular shape, then the back holes preferably are disposed at all of the positions corresponding to the partition wall intersections, and when the cells have a quadrangular shape, then the back holes are preferably disposed at alternate intersections of the honeycomb partition wall in a staggered pattern.

The first plate-shaped part 307 includes a plate-shaped member made of tungsten carbide based cemented carbide. The width of the slit 309 is very narrow as compared with the diameter of the back hole 305. This means that, when the forming raw material is extruded, pressure in the back hole 305 is increased and stress concentrates on the slit 309, which often leads to problems of wearing and deformation, for example. Then, the first plate-shaped part 307 is made of tungsten carbide based cemented carbide that is a material having wear resistance. Herein, "tungsten carbide based cemented carbide (cemented carbide)" is an alloy where tungsten carbide and a bonding material are sintered. The bonding material is preferably at least one type of metal selected from the group consisting of cobalt (Co), iron (Fe), nickel (Ni), titanium (Ti) and Chromium (Cr). Such tungsten carbide based cemented carbide has especially excellent wear resistance and mechanical strength.

The size of the first plate-shaped part 307 is not limited especially, and it may have a desired size in accordance with the purpose. Herein when the first plate-shaped part 307 has a circular plate shape, the diameter of the circular plate is preferably 20 to 40 mm. When the first plate-shaped part 307 and the second plate-shaped part 303 have a circular plate shape, then the diameter of the first plate-shaped part 307 is 90 to 100% of the diameter of the second plate-shaped part 303. The thickness of the first plate-shaped part 307 is preferably 0.3 to 1.2 mm, where 0.5 to 0.9 mm is more preferable. The thickness of the first plate-shaped part 307 is preferably 0.05 to 2 times the thickness of the second plate-shaped part 303.

As described above, the first plate-shaped part 307 includes the first layer 307a disposed on the second plate-shaped part 303 side and the second layer 307b disposed on the first layer 307a. Since the die 301 at the first plate-shaped part includes these two layers of the first layer 307a and the second layer 307b, stress during extrusion can be mitigated, and so breakage can be prevented. The first layer 307a and the second layer 307b may be made of the same type of materials or of different types of materials.

In this way, the first layer 307a is one layer making up the first plate-shaped part 307, and is disposed on the second plate-shaped part 303 side. Herein, the first layer 307a includes the hole part 311. The first layer 307a preferably is a layer made of cemented carbide having Vickers hardness of 2,000 to 3,000 HV and having the Young's modulus of 600 to 800 GPa. When the first layer 307a has such Vickers hardness and Young's modulus, it can be a layer having hardness and toughness that can resist the stress applied to the hole part 311. Then problems such as breakage of the first plate-shaped part 307, which may result from the stress from the forming raw material flowing into the hole part 311 from the back hole 305, can be prevented, and so the life of the die can be lengthened. The hole part 311 is open at both faces of the first layer 307a.

The first layer 307a preferably has Vickers hardness of 2,000 to 3,000 HV, where 2,000 to 2,200 HV is more preferable. With such predetermined Vickers hardness, the first layer 307a can have hardness so as to resist the stress from the ceramic raw material flowing into the hole part 311 from the back hole 305. Then wearing of the hole part 311 can be prevented. If the Vickers hardness of the first layer 307a is less than 2,000 HV, wearing may occur due to the lack of strength. If the Vickers hardness of the first layer 307a exceeds 3,000 HV, it is too hard, and so the first layer 307a may easily break. The first layer 307a preferably has the Young's modulus of 600 to 800 GPa, where 600 to 700 GPa is more preferable. This can prevent breakage of the first layer 307a. If the Young's modulus of the first layer 307a is less than 600 GPa, the toughness is too small, which may cause problems such as breakage. If the Young's modulus exceeds 800 GPa, the toughness is too large, which may lead to the risk of deformation of the hole part 311. When the honeycomb structure is formed using a die having the deformed hole part 311, then distortion occurs at the honeycomb structure and the formability deteriorates.

As described above, the second layer 307b is one layer making up the first plate-shaped part 307, and is disposed on the first layer 307a. The second layer 307b includes the slit 309, and the slit 309 is open at both faces of the second layer 307b. Herein "both faces of the second layer 307b" mean both faces including the face of the second layer 307b in contact with (bonded to) the first layer 307a and the face on the opposite side (rear side) of the face in contact with the first layer 307a. In FIG. 16, the discharge port of the forming raw material at the slit 309 is indicated as an open end 309a of the slit 309. The second layer 307b preferably has Vickers hardness of 500 to 3,000 HV and the Young's modulus of 400 to 700 GPa. When the second layer 307b has such Vickers hardness and Young's modulus, it can be a layer having sufficient hardness and toughness that can resist the stress applied to the slit 309. Then deformation and wearing of the slit 309 can be prevented.

The second layer 307b preferably has Vickers hardness of 500 to 3,000 HV, where Vickers hardness of 2,000 to 3,000 HV is more preferable. Such Vickers hardness can suppress wearing of the second layer 307b. If the Vickers hardness of the second layer 307b is less than 500 HV, wearing may occur easily due to the lack of hardness. If the Vickers hardness exceeds 3,000 HV, the second layer 307b may easily break.

The second layer 307b preferably has the Young's modulus of 400 to 700 GPa, where the Young's modulus of 500 to 700 GPa is more preferable. Such Young's modulus of the second layer 307b makes the layer hard to break. If the Young's modulus of the second layer 307b is less than 400 GPa, problems such as breakage easily occur due to too small toughness. If the Young's modulus exceeds 700 GPa, then the toughness is too large, and so the second layer 307b easily is deformed.

It is preferable that, in the die 301, the Vickers hardness and the Young's modulus of the second layer 307b are larger than the Vickers hardness and the Young's modulus of the first layer 307a. That is, it is preferable that the Vickers hardness of the second layer 307b is larger than the Vickers hardness of the first layer 307a, and the Young's modulus of the second layer 307b is larger than the Young's modulus of the first layer 307a. In such a relationship, the second layer 307b including the slit 309 hardly becomes worn, and the first layer 307a including the hole part 311 hardly breaks. Then, the life of the die can be lengthened more due to the second layer 307b suppressing wearing and the first layer 307a suppressing breakage.

In the die 301, it is preferable that the Vickers hardness of the second layer 307b is larger than the Vickers hardness of the first layer 307a by 1,000 to 2,500 HV, and the Young's modulus of the second layer 307b is larger than the Young's modulus of the first layer 307a by 50 to 300 GPa. Then, the first plate-shaped part 307 can have the second layer 307b having wear resistance and the first layer 307a having high toughness reliably, and so the life of the die can be lengthened.

The thickness of the first layer 307a is preferably 0.1 to 5 mm, and the thickness of the first layer 307a is 0.2 to 5 mm more preferably. Such a range of the thickness of the first layer 307a can suppress wearing of the second plate-shaped part effectively. If the thickness of the first layer 307a is less than 0.1 mm, the second plate-shaped part easily becomes worn. If the thickness of the first layer 307a exceeds 5 mm, pressure during extrusion may increase too high due to such a thick die.

The thickness of the second layer 307b is preferably 0.3 to 4 mm, and the thickness is 1 to 4 mm more preferably. Such a range of the thickness of the second layer 307b can suppress deformation of the honeycomb structure after extrusion. If the thickness of the second layer 307b is less than 0.3 mm, the honeycomb structure after extrusion may be deformed, and the second layer 307b may become worn or be deformed. If the thickness of the second layer 307b exceeds 4 mm, then the second layer 307b is too thick and so the depth of the slit (the length of the slit in the extruding direction of the forming raw material) is too large, so that pressure during extrusion becomes too high. Further, a part surrounded by the slit is extremely long and thin, and the part may be torn due to friction with kneaded material. In order to prevent such events, a deep slit is not allowed. On the other hand, when the slit is shallow in an adequate degree, then relative fluctuations in the slit depth increase between a plurality of slits. As a result, the honeycomb structure after extrusion also can have adequate fluctuations in shape, and so self-induced oscillations of acoustic waves easily occur.

As stated above, the first plate-shaped part 307 includes the slit 309 that is in communication with the hole part 311 and is to form the forming raw material. The slit 309 is a gap (cut) formed in the first plate-shaped part 307. The forming raw material introduced from the back hole 305 enters the slit 309 in the die, and then the forming raw material is pushed out from the open end 309a of the slit 309, whereby a formed body in a honeycomb shape can be formed.

As stated above, the slit 309 is open at both faces of the second layer 307b. Although the slit 309 may be formed at the second layer 307b only, it is preferable that the slit is formed at the first layer 307a as well. When it is formed at the first layer 307a, the slit 309 formed at the second layer 307b is extended to the first layer side so as to be formed at the first layer 307a preferably. In this case, the slit 309 at the first layer 307a is formed at the face of the first layer 307a in contact with the second layer 307b. Then in this case, the depth of the slit 309 is larger than the thickness of the second layer 307b. It is preferable that the depth of the slit 309 is 0.3 to 1.0 mm, where 0.4 to 0.8 mm is more preferable. It is preferable that the depth of the slit 309 at a part extended to the first layer side is 0.1 to 0.5 mm, where 0.2 to 0.5 mm is more preferable. This can form a formed body of a favorable honeycomb shape. It is preferable that the width of the slit 309 is 0.03 to 0.05 mm, where 0.04 to 0.05 mm is more preferable.

As described above, the first layer 307a of the first plate-shaped part 307 includes the hole part 311 therein, where this hole part 311 is in communication with the back hole 305 formed at the second plate-shaped part 303 and the slit 309 formed at the first plate-shaped part 307. The hole part 311 is a through hole as well that is formed at the first layer 307a of the first plate-shaped part 307. That is, the hole part 311 is a through hole that is open at the face of the second layer 307b on the side in contact with the second plate-shaped part 303 (the first bonding face 310 of the first plate-shaped part 307) and is open at the face of the second layer 307b in contact with the first layer 307a (the other face 307ba of the second layer). As shown in FIG. 16, the first bonding face 310 is a face of the first plate-shaped part 307 that is bonded (in contact with) to the second plate-shaped part 303. Such a hole part 311 allows a forming raw material introduced from the back hole 305 formed at the second plate-shaped part 303 to pass through the hole part 311 and enter the slit 309. Then the forming raw material is pushed out from the open end 309a of the slit 309, whereby a honeycomb shaped formed body (honeycomb structure) can be formed. It is preferable that the depth h of the hole part 311 (see FIG. 16) is 0.1 to 4 mm, where 0.2 to 3 mm is more preferable. Such a range of the depth h of the hole part 311 can suppress wearing at the second plate-shaped part 303 effectively. If the depth h of the hole part is less than 0.1 mm, the strength of the first plate-shaped part 307 easily deteriorates during extrusion of the forming raw material. If the depth h of the hole part exceeds 4 mm, it tends to be difficult to form the hole part by processing the first plate-shaped member during preparation of the die. Herein, the depth h of the hole part 311 is a distance from the first bonding face 310 of the first plate-shaped part 307 to the other face 307ba of the second layer 307b as shown in FIG. 16. Herein, the depth of the hole part 311 equals the thickness of the first layer 307a. It is preferable that the diameter of the open end 311a of the hole part 311 is 0.15 to 0.4 mm, where 0.2 to 0.4 mm is more preferable. The hole part 311 may be formed by machine processing, such as electrochemical machining (ECM), electrical discharge machining (EDM), laser processing and drill processing, for example. Among these methods, electrochemical machining (ECM) is preferable because it can form the hole part 311 effectively and precisely. The space in the hole part 311 is preferably in a round-pillar shape. In this case, the diameter (diameter of the hole part 311) in a cross section orthogonal to the flowing direction of the forming raw material (thickness direction of the first plate-shaped part) in the hole part 311 can have a constant value. At this time, the diameter of the hole part 311 is equal to the diameter of the open end 311a of the hole part at the first bonding face 310. The number of the hole parts 311 is preferably the same number as that of the back holes.

As shown in FIG. 16, the die 301 is formed so that the diameter dl of the open end 311a (circle) of the hole part 311 at the first bonding face 310 is the same size as that of the diameter D1 of the open end 305a (circle) of the back hole at the second bonding face 306. As shown in FIG. 16, the second bonding face 306 is a face of the second plate-shaped part 303 that is bonded to (in contact with) the first plate-shaped part 307. The open end 311a of the hole part 311 at the first bonding face 310 is an inlet part of the through hole (inflow part of the forming raw material) that is open at the first bonding face 310. The open end 305a of the back hole 305 at the second bonding face 306 is an outlet part (outlet part of the forming raw material) on the second bonding face 306 side that is open at the second bonding face 306 of the back hole 305. As the forming raw material passes through this outlet part, it is then supplied to the hole part 311.

Herein it is preferable that the die includes a retainer plate configuration to fix the die for extrusion.

Figure 17:
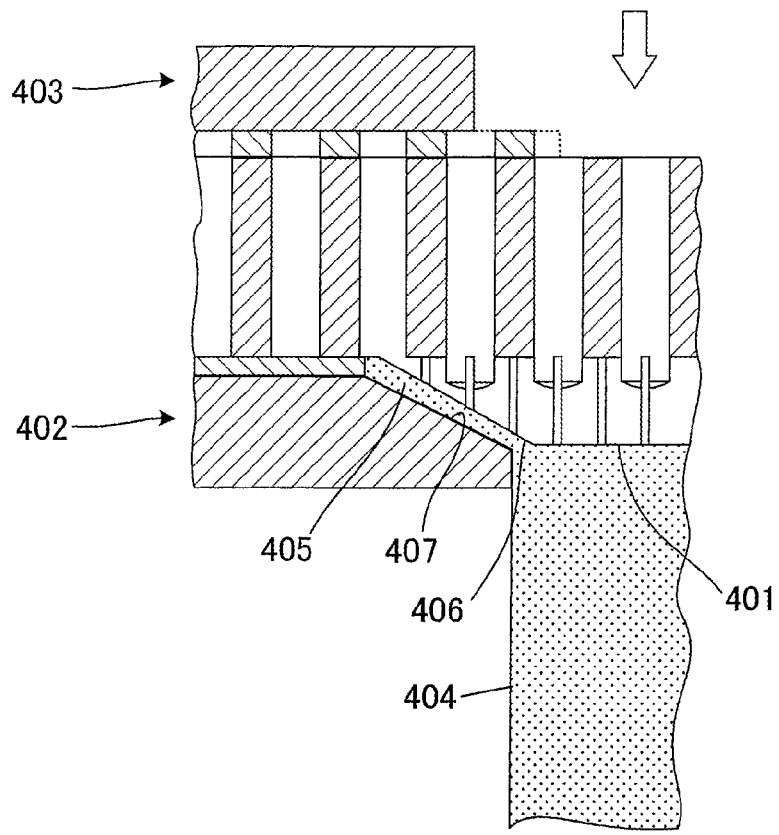
FIG. 17 shows an example of the retainer plate configuration.

FIG. 17 shows an example of the retainer plate configuration.

In the retainer plate configuration of FIG. 17, the forming raw material is pushed out in the direction of the downward arrow in FIG. 17. At this time, a rear retaining part 403 can adjust the amount of kneaded material that flows in. A die 401 is fixed by a retainer 402, and a forming raw material that is pushed out from a gap 405 between the die 401 and the retainer 402 defines a circumferential part of a honeycomb formed body 404 while being adjusted by an inclined face 406 and an opposed face 407.

Figure 18:
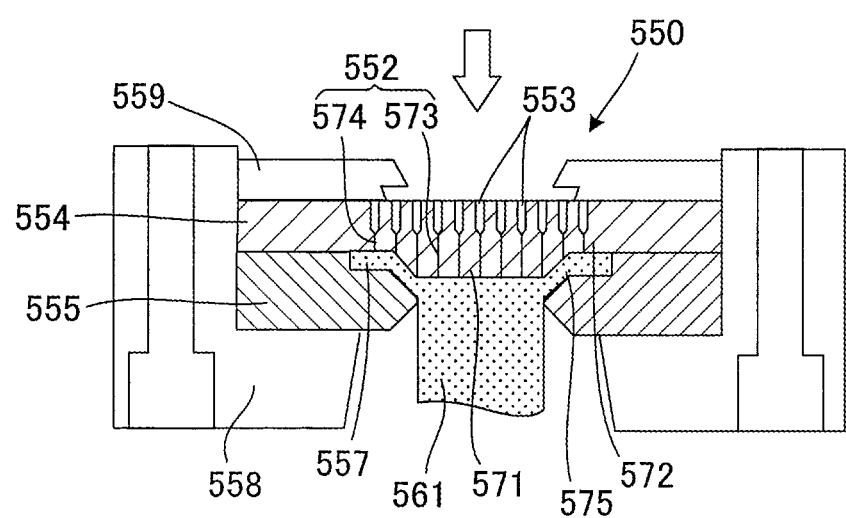
FIG. 18 shows another example of the retainer plate configuration that is different from FIG. 17.

FIG. 18 shows another example configuration of the retainer plate configuration that is different from FIG. 17.

In a retainer plate configuration 550 of FIG. 18, the forming raw material is pushed out in the direction of the downward arrow in FIG. 18. This retainer plate configuration 550 includes a back hole 553 to supply a forming raw material, a die 554 having a slit 552 to push out the forming raw material and a retaining plate 555 that is disposed downstream of the die 554. The die 554 includes an inside part 571 and a circumference part 572. The inside part 571 protrudes toward the downstream (downward in FIG. 18) to define a step height 575 with the circumference part 572, and this inside part 571 is provided with a slit 573 to form a honeycomb structure. The circumference part 572 is then provided with a slit 574 that is shorter than the slit 573. Between the die 554 and the retaining plate 555, a gap part 557 to form the outer wall of the honeycomb structure is formed. Herein a retaining jig 558 and a rear-retaining plate 559 are holders to set the die 554 and the retaining plate 555.

During extrusion using the retainer plate configuration 550 in FIG. 18, the forming raw material is pushed out from the upstream side of the die 554 (above in FIG. 18) toward the downstream via the die 554 by an extruder (not shown). The forming raw material 561 that is pushed out from the slit 573 at the inside part 571 of the die 554, the slit being open on the downstream side, is formed to be a honeycomb structure including a lot of cells. On the other hand, the forming raw material 561 that is pushed out from the slit 574 at the circumference part 572 of the die 554 has a crushed honeycomb shape by the action at the gap part 557, and changes the traveling direction from the pushing-out direction to the direction toward the step height 575 and changes again the traveling direction to the pushing-out direction at the place where the retaining plate 555 is open so as to form the outer wall surrounding the cells.

Figure 19:
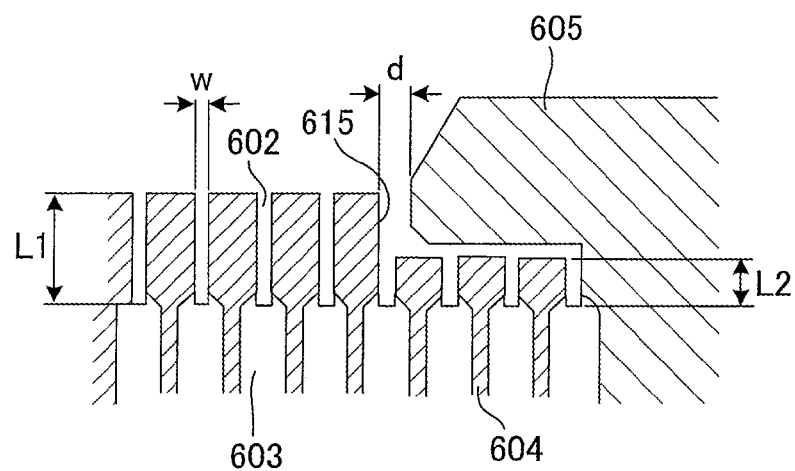
FIG. 19 shows still another example of the retainer plate configuration.
Figure 19:
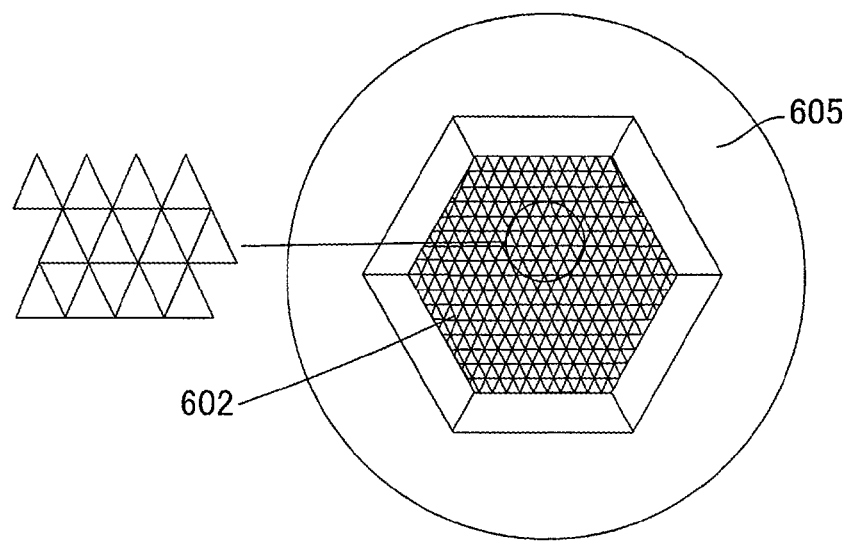
Figure 20:
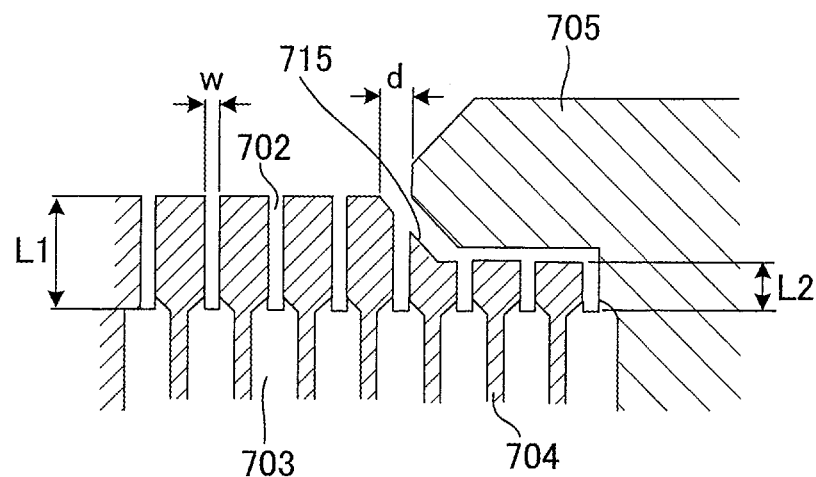
FIG. 20 shows a further example of the retainer plate configuration that is different from FIG. 19.
Figure 20:
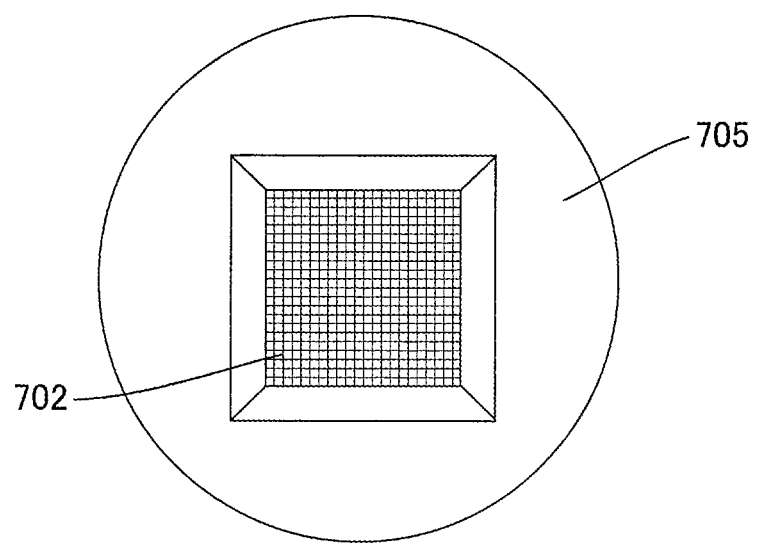

FIG. 19 shows still another example of the retainer plate configuration. FIG. 20 shows a further example of the retainer plate configuration that is different from FIG. 19.

The retainer plate configuration in FIG. 19(*a*) includes a die 604 having slits 602 to form the periodic arrangement of regular triangles as shown in FIG. 19(*b*). This die 604 is to form a honeycomb structure having a regular triangular cell shape, which is fixed by a retaining plate 605. Herein the slits 602 are in communication with back holes 603. In this retainer plate configuration, the shape (dimensions) of the honeycomb formed body to be formed is determined by the length L1 of the slits 602, the length L2 that is a difference between the length L1 of the slits 602 and the height of a step height 615, the width W of the slits 602 and the distance d between the retaining plate 605 and the step height 615.

FIG. 20 shows a further example of the retainer plate configuration that is different from FIG. 19.

The retainer plate configuration in FIG. 20(*a*) includes a die 704 having slits 702 to form the periodic arrangement of squares as shown in FIG. 20(*b*). This die 704 is to form a honeycomb structure having a square cell shape, which is fixed by a retaining plate 705. Herein the slits 702 are in communication with back holes 703. In this retainer plate configuration also, the shape (dimensions) of the honeycomb formed body to be formed is determined by the length L1 of the slits 702, the length L2 that is obtained by subtracting the height of a step height 715 from the length L1 of the slits 702, the width W of the slits 702 and the distance d between the retaining plate 705 and the step height 715.

In both of the retainer plate configurations in FIG. 19 and FIG. 20, it is preferable that the length L1 of the slits 702 is 0.3 to 1.0 mm, where 0.4 to 0.8 mm is more preferable. Then it is preferable that the length L2 as the difference is 0.1 to 0.5 mm.

The following continues the description on the following processing for the plurality of honeycomb formed bodies that are obtained by the extrusion.

Preferably the thus obtained plurality of honeycomb formed bodies are dried before firing. A method for drying is not limited especially, and exemplary methods include an electromagnetic wave heating method such as microwave heat-drying and high-frequency induction heating drying and an external heating method such as hot air drying and superheated steam drying. After a certain amount of water may be dried by an electromagnetic wave heating method, followed by an external heating method to dry the remaining water. In this case, it is preferable that, after 30 to 90 mass % of water with reference to the water amount before drying is removed by an electromagnetic heating method, followed by an external heating method to reduce water amount to 3 mass % or less. A preferable electromagnetic wave heating method includes induction heating drying, and a preferable external heating method includes hot air drying.

If the length of the honeycomb formed body in the cell penetrating direction is not a desired length, it is preferable to cut both of the end faces (end parts) to have the desired length. Although a method for cutting is not limited especially, exemplary method includes a method using a circular saw cutter.

Next, the plurality of honeycomb formed bodies are fired to complete a plurality of honeycomb segments 15. It is preferable to perform calcination before firing to remove the binder and the like. The calcination is preferably performed at 400 to 500° C. for 0.5 to 20 hours in the ambient atmosphere. A method for calcination or firing is not limited especially, and they may be performed using an electric furnace, a gas furnace, or the like. As the firing conditions, it is preferably heated at 1,300 to 1,500° C. for 1 to 20 hours in an inert atmosphere of nitrogen, argon, or the like when a silicon-silicon carbide based composite material is used, for example. When an oxide-based material is used, it is preferably heated at 1,300 to 1,500° C. for 1 to 20 hours in an oxygen atmosphere.

Next, the plurality of honeycomb segments 15 are arranged so that their side faces are opposed, which are then bonded with a bonding material that is a material before solidification of the bonding part 12, followed by drying. A method to apply the bonding material to the side faces of the honeycomb segments is not limited especially, and a conventional method using a brush may be used, and it is preferable to apply it on the opposed side faces as a whole. This is because the bonding part 12 plays a role of buffering (absorbing) thermal stress as stated above, in addition to the role of bonding the honeycomb segments mutually. Herein, the bonding material may be slurry, for example, which is prepared by adding an additive such as organic binder, foamable resin or dispersing agent to a raw material including inorganic particles and colloidal oxide, to which water is added, followed by kneading. Herein exemplary inorganic particles include particles made of a ceramic material containing one or two or more in combination of cordierite, alumina, aluminum titanate, silicon carbide, silicon nitride, mullite, zirconia, zirconium phosphate and titanic, or particles of Fe—Cr—Al-based metal, nickel-based metal and silicon (metal silicon)-silicon carbide based composite materials. Exemplary colloidal oxide includes silica sol and alumina sol.

Next, the circumferential part of these plurality of honeycomb segments 15 mutually bonded with the bonding material as a whole is cut so as to achieve a desired cross-sectional shape of the heat/acoustic wave conversion component 1. Then, an outer coating material is applied to the circumferential face of the plurality of honeycomb segments 15 after cutting as a whole, followed by drying. Herein, the outer coating material used may be the same material as that of the bonding material. A method for applying the outer coating material is not limited especially, and for example, the coating material may be coated with a rubber spatula, for example, while rotating the honeycomb segment bonded body on a wheel.

Through this process, the heat/acoustic wave conversion component 1 is finally completed.

Next, the following describes a method for manufacturing the high-temperature side heat exchanger 2 in FIG. 3.

The heat-exchanging honeycomb structure 20 in the high-temperature side heat exchanger 2 of FIG. 3 can be manufactured by a manufacturing method similar to the method for manufacturing the heat/acoustic wave conversion component 1 as stated above, other than that mixture of carbon powder (e.g., graphite powder) with SiC powder is used as the ceramic raw material, a die suitable for a honeycomb formed body having a relatively large hydraulic diameter of cells is used as the die for extrusion, and the process for segment bonding is omitted (i.e., a honeycomb structure is manufactured using a single honeycomb segment).

To manufacture this heat-exchanging honeycomb structure 20, for example, including a Si impregnated SiC composite material as a main component, it is preferable that a kneaded material prepared by mixing SiC powder with carbon powder and kneading for adjustment is formed to be a honeycomb formed body, then drying and sintering processing are performed thereto, and then molten silicon (Si) is impregnated in this honeycomb formed body. Such processing can form a configuration where coagulation of metal Si (metal silicon) surrounds the surface of SiC particles after the sintering processing, and SiC particles are mutually bonded via metal Si. Such a configuration can achieve high heat durability and heat conductivity in spite of the dense configuration with small porosity.

In addition to the molten silicon (Si), other metals such as Al, Ni, Cu, Ag, Be, Mg, and Ti may be used for impregnation. In this case, after sintering, coagulation of metal Si (metal silicon) and other metals used for impregnation surrounds the surface of SiC particles, and SiC particles are mutually bonded via metal Si and other metals used for impregnation in the formed configuration. Such a configuration also can achieve high heat durability and heat conductivity in spite of the dense configuration with small porosity.

As the outer coating material of the heat-exchanging honeycomb structure 20 as well, particles of silicon (metal silicon)-silicon carbide based composite material is preferably used for the same reason as stated above, among the particles made of the materials as stated above as the candidates of inorganic particles of the material of the outer coating material (the material of the bonding material of the heat/acoustic wave conversion component 1).

It is preferable to perform slit formation processing to form a slit in the cell penetrating direction at the circumferential wall formed by the application of the outer coating material. When the slit formation processing is performed, a heat resistant metal plate 21d and a fin 21e may be formed when the high-temperature side annular tube 21 is manufactured as described below.

The high-temperature side annular tube 21 on the high-temperature side heat exchanger 2 in FIG. 3 is prepared by forming a material of high heat resistance to be an annular shape (herein, the annular shape such that a part of the wall face on the center side is partially omitted so that, when being coupled with the heat-exchanging honeycomb structure 20, a part of the circumferential wall of the heat-exchanging honeycomb structure 20 is exposed in the high-temperature side annular tube). Such a material of high heat resistance is not limited especially, and specific examples include metal such as stainless steel and copper of high heat resistance and ceramic materials (e.g., those listed as the materials of the heat/acoustic wave conversion component 1 and the heat-exchanging honeycomb structure 20).

The high-temperature side heat exchanger 2 in FIG. 3 is completed basically by assembling the heat-exchanging honeycomb structure 20 at a center part that is a hole at the annular shape of the high-temperature side annular tube 21.

Next the following describes a method for manufacturing the low-temperature side heat exchanger 3 in FIG. 3. When a conventionally known heat exchanger is used as the low-temperature side heat exchanger 3, a method for manufacturing such a conventionally known heat exchanger can be used. When the device having the same configuration as that of the high-temperature side heat exchanger 2 stated above is used as the low-temperature side heat exchanger 3, the same manufacturing method as that of the high-temperature side heat exchanger 2 as stated above can be used.

As other members of the heat/acoustic wave conversion unit 100 in FIG. 3, e.g., the metal member 32, the housing 100a, and the interference member 1a, those conventionally known can be used, and they can be manufactured by a conventionally known method.

EXAMPLES

The following describes the present invention more specifically by way of examples, and the present invention is by no means limited to these examples.

Example 1

In the heat/acoustic wave conversion unit of Example 1, the heat/acoustic wave conversion component 1 was prepared as follows. Firstly, cordierite forming raw material was used as the ceramic raw material, and 35 parts by mass of dispersing medium, 6 parts by mass of organic binder, and 0.5 parts by mass of dispersing agent were added to 100 parts by mass of the cordierite forming raw material, followed by mixing and kneading to prepare a kneaded material. The cordierite forming raw material used included 38.9 parts by mass of talc of 3 μM in average particle size, 40.7 parts by mass of kaolin of 1 μm in average particle size, 5.9 parts by mass of alumina of 0.3 μm in average particle size, and 11.5 parts by mass of boehmite of 0.5 μM in average particle size. Herein the average particle size refers to a median diameter (d50) in the particle distribution of each raw material.

Water was used as the dispersing medium. Hydroxypropylmethylcellulose was used as the organic binder. Ethylene glycol was used as the dispersing agent.

Next, the thus obtained kneaded material was extruded using a die, so that a plurality of honeycomb formed bodies each including triangular cells and having a hexagonal overall shape were prepared. During this extrusion, prior to the extrusion using a regular die corresponding to the honeycomb segments of Example 1, the kneaded material was extruded using a dummy die of about 0.07 mm in rib thickness. Then, using the kneaded material after the extrusion using this dummy die, extrusion using the real die was executed. At this time, the ratio of water in the kneaded material used for the extrusion using the real die was strictly controlled in the kneaded material component so that it was 41 parts by mass (error was within ±1 part by mass) with reference to 100 parts by mass of the kneaded material solid component.

At this time, the retainer plate configuration in FIG. 19 was used as the retainer plate configuration for the die. In this retainer plate configuration, the length L1 (see FIG. 19) of the slit was 0.5 mm and the length L2 (see FIG. 19) obtained by subtracting the height of the step height from the slit length L1 was 0.2 mm. Then, the width W (see FIG. 19) of the slit was 0.05 mm, and the distance d (see FIG. 19) between the retaining plate and the step height was 0.5 mm.

Then, these plurality of honeycomb formed bodies were dried by a microwave dryer, and then were dried completely by a hot-air drier, and then both end faces of the honeycomb formed bodies were cut so as to adjust the length of the honeycomb formed bodies in the cell penetrating direction. Such honeycomb formed bodies were dried by a hot-air drier, and then were fired at 1,445° C. for 5 hours, whereby the honeycomb segments were completed.

Next, the plurality of honeycomb segments were arranged so that their side faces are opposed, which were then bonded with a bonding material that was a material before solidification of the bonding part 12, followed by drying. An application method at this time was using a brush, and it was applied on the opposed side faces as a whole. The bonding material used was slurry prepared by adding organic binder, foamable resin and dispersing agent to a raw material including cordierite particles and silica sol, to which water was added and kneaded.

Next, the circumferential part of these plurality of honeycomb segments mutually bonded with the bonding material as a whole was cut to have a round-pillar shape. Then, an outer coating material was applied to the circumferential face of the plurality of honeycomb segments 15 after cutting as a whole, followed by drying. An application method at this time was using a rubber spatula, while rotating the plurality of honeycomb segments after cutting as a whole on a wheel. The outer coating material used may be the same material as that of the bonding material.

Through this process, the heat/acoustic wave conversion component in the heat/acoustic wave conversion unit of Example 1 was completed.

The high-temperature side heat exchanger in the heat/acoustic wave conversion unit of Example 1 was prepared as follows.

The heat-exchanging honeycomb structure of the members making up the high-temperature side heat exchanger was prepared as follows.

Kneaded material was prepared by a similar method to the manufacturing method of the heat/acoustic wave conversion component in Example 1 as stated above other than that mixture of carbon powder (e.g., graphite powder) with SiC powder was used instead of the cordierite forming raw material.

Next, the thus obtained kneaded material was extruded using a die, so that a plurality of honeycomb formed bodies each including triangular cells were prepared. This die was suitable to prepare a honeycomb formed body having a relatively large hydraulic diameter of cells as compared with the die for the honeycomb formed body that was used in the manufacturing method of the heat/acoustic wave conversion component in Example 1 as stated above. Especially, the die for the heat-exchanging honeycomb structure had the period that was integral multiples of the period of the extrusion port of the die for the honeycomb formed body that was used in the manufacturing method of the heat/acoustic wave conversion component so that the period of the cells in the honeycomb formed body of the heat-exchanging honeycomb structure was integral multiples of the period of the cells in the honeycomb formed body of the heat/acoustic wave conversion component as stated above.

Then these honeycomb formed bodies after extrusion were dried by a microwave dryer, and then were dried completely by a hot-air drier, and then both end faces of the honeycomb formed bodies were cut so as to adjust the length of the honeycomb formed bodies in the cell penetrating direction. Such honeycomb formed bodies were dried by a hot-air drier, and then were fired at 1,445° C. for 5 hours.

After firing the formed bodies, these honeycomb formed bodies were impregnated with molten silicon (Si).

Next, the circumferential part of the honeycomb formed bodies after impregnation was cut to have a round-pillar shape, so that the cross-sectional shape of the honeycomb formed bodies agreed with the shape of the heat/acoustic wave converter as stated above. Then, an outer coating material was applied to the circumferential face of the honeycomb formed bodies after cutting, followed by drying. An application method at this time was using a rubber spatula, while rotating the honeycomb formed bodies after cutting on a wheel. The outer coating material used was slurry, prepared by adding organic binder, foamable resin and dispersing agent to a raw material including particles of a silicon (metal silicon)-silicon carbide based material and silica sol similar to the material making up the honeycomb formed bodies after sintering, to which water was added, followed by kneading.

Finally, slit-formation processing was performed using a diamond grindstone to the circumferential wall of the honeycomb formed bodies, to which the outer coating material was applied, followed by drying, so that a slit was formed along the cell penetrating direction. Through such process, the heat-exchanging honeycomb structure was completed.

The high-temperature side annular tube of the members making up the high-temperature side heat exchanger was prepared by forming a stainless steel material of high heat resistance to be an annular shape. In this case, two high-temperature side annular tubes, which are used in the high-temperature side heat exchanger that is of the type of the high-temperature side heat exchanger 2' shown in FIGS. 6 and 7, were prepared.

The heat-exchanging honeycomb structure completed in such a way described above was attached to these two high-temperature side annular tubes, and then two in-tube honeycomb structures, which were prepared by the manufacturing method similar to that of the heat-exchanging honeycomb structure, were attached internally to the two high-temperature side annular tubes, respectively, as well. Thereby, the high-temperature side heat exchanger of the same type as the high-temperature side heat exchanger 2' shown in FIG. 6 was completed.

The low-temperature side heat exchanger was prepared by preparing a low-temperature side annular tube made of stainless steel and a copper mesh lamination including the lamination of copper mesh plates, and assembling this mesh lamination at a center part that was a hole of the annular shape of this low-temperature side annular tube.

As other members of the heat/acoustic wave conversion unit of Example 1, e.g., the metal member, the housing, and the interference member, a metal member prepared by processing a copper plate, a housing prepared by processing a stainless steel member and an interference member made of known insulating glass fiber (such as Siliglass) having heat durability were used, respectively.

Through this process, the heat/acoustic wave conversion unit of Example 1 was completed.

For the heat/acoustic wave conversion component in the completed heat/acoustic wave conversion unit of Example 1, the following measurements were performed.

From the heat/acoustic wave conversion component, one honeycomb segment was chosen at random. Then, as for this honeycomb segment, the following properties were measured, including: the hydraulic diameter HD of the cells; the open frontal area; the heat conductivity of the material; the length L between both end faces; the Young's modulus of the material; the thermal expansion coefficient of the material (at room temperatures); the heat capacity of the material; and the cross-sectional area in a plane perpendicular to the cell penetrating direction. The hydraulic diameter HD of the cells was obtained as follows. That is, an enlarged photo of the cross section of the one honeycomb segment in a plane perpendicular to the cell penetrating direction was taken, and 10 cells were selected at random in this honeycomb segment. Then, the hydraulic diameter of each was calculated by the expression to define the hydraulic diameter: HD=4× S/C, where S denotes the cross-sectional area of the cell and C denotes the perimeter of this section, and then average of them was calculated as the hydraulic diameter.

At the bonding part, the Young's modulus of the material (the same as the Young's modulus of the circumferential wall), the thermal expansion coefficient of the material (at room temperatures), the heat capacity of the material, the width of the bonding part between neighboring honeycomb segments, and the total cross-sectional area at the bonding part in a plane perpendicular to the cell penetrating direction were measured.

Then, the diameter and the cross-sectional area of the heat/acoustic wave conversion component were measured in a plane perpendicular to the cell penetrating direction.

Based on the measurement values obtained through the measurement as stated above, the following fourteen types of parameters were obtained. The following fourteen types of parameters include ones that are not independent mutually and change together with other parameters, but such parameters also are described for the sake of descriptions.

(1) hydraulic diameter HD of the cells in a plane perpendicular (perpendicular plane) to the cell penetrating direction, (2) open frontal area at the end faces of honeycomb segment, (3) heat conductivity of honeycomb segment, (4) thermal expansion coefficient of honeycomb segment, (5) ratio of the Young's modulus at the circumferential wall to the Young's modulus of honeycomb segment, (6) cross-sectional area of one honeycomb segment in the perpendicular plane, (7) diameter D of the heat/acoustic wave conversion component in the perpendicular plane, (8) ratio L/D of the length L of honeycomb segment to the diameter D of the heat/acoustic wave conversion component, (9) length L of honeycomb segment, (10) ratio HD/L of the hydraulic diameter HD of the cells to the length L of honeycomb segment, (11) ratio of Young's modulus at the bonding part to Young's modulus of honeycomb segment, (12) ratio of the thermal expansion coefficient at the bonding part to the thermal expansion coefficient of honeycomb segment, (13) ratio of the heat capacity at the bonding part to the heat capacity of honeycomb segment, and (14) width of the bonding part between neighboring honeycomb segments.

Table 1 describes the values of parameters from (1) to (9) that do not directly relate to the bonding part among these fourteen parameters for the heat/acoustic wave conversion component in the heat/acoustic wave conversion unit of Example 1, and Table 2 describes the values of parameters from (10) to (14) that relate to the bonding part. Table 2 describes the segmented structure (bonded type or monolithic type) and the shapes of the cells and segments in addition to the value of parameters from (10) to (14).

The following experiments 1 and 2 were conducted using the heat/acoustic wave conversion component in the heat/acoustic wave conversion unit of this Example 1.

Experiment 1 was as follows. Firstly, the heat/acoustic wave conversion component in the heat/acoustic wave conversion unit of Example 1 was assembled in the power generation system 1000 of FIG. 1, instead of the heat/acoustic wave conversion component 1. Then, exhaust gas from an automobile at about 500° C. was allowed to flow into the high-temperature side heat exchanger 2, and the temperature of the exhaust gas flowing out whose temperature fell to some extent was measured. Based on a temperature change at this time, the amount of heat flowing into this power generation system was calculated. Due to the flowing-in of this exhaust gas, the end of the heat/acoustic wave conversion component on the side of the high-temperature side heat exchanger 2 had a temperature kept about at 500° C. Meanwhile, water at 60° C. was allowed to flow into the low-temperature side heat exchanger 3 so as to let the end of the heat/acoustic wave conversion component on the side of the low-temperature side heat exchanger 3 keep the temperature at 60° C. Then, measurement was performed using a microphone or the like as the energy converter of the power generation system 1000 of FIG. 1 as to what degree of electric power was generated from acoustic waves by a thermoacoustic effect due to the temperature difference between the both ends of the heat/acoustic wave conversion component as stated above. Then, a measurement value of the electric power amount was divided by the energy conversion efficiency (efficiency to convert acoustic-wave energy into electric power) of the microphone known beforehand, whereby an estimated value of acoustic-wave energy was obtained. Then, based on this estimated value of acoustic-wave energy and the amount of heat flowing into the power generation system as stated above, energy conversion efficiency from heat to acoustic-wave energy was obtained. In this experiment, working fluid in the looped tube 4, the resonant tube 5 and the cells causing self-induced oscillations was helium gas at 10 atm.

Experiment 2 was as follows. Flowing-in of the exhaust gas as stated above was performed continuously for 24 hours. After a lapse of 24 hours, damage of the heat/acoustic

TABLE 1

| | Cell hydraulic diameter HD (mm) | Segment open frontal area (%) | Segment heat conductivity (W/mK) | Segment thermal expansion coefficient (ppm/K) | Circumferential wall Young's modulus/segment Young's modulus | Segment cross-sectional area (cm$^2$) | Heat/acoustic wave conversion component diameter D (mm) | Segment length L/heat/acoustic wave conversion component diameter D | Segment length L (mm) | Hydraulic diameter HD/segment length L |
|---|---|---|---|---|---|---|---|---|---|---|
| Ex. 1 | 0.2 | 80 | 1 | 1.2 | 0.2 | 9 | 40 | 0.75 | 30 | 0.0067 |

TABLE 2

| | Bonding/monolithic | Cell shape/segment shape | Bonding part Young's modulus/segment Young's modulus | Bonding part thermal expansion coefficient/segment thermal expansion coefficient | Bonding part heat capacity/segment heat capacity | Bonding part width (mm) |
|---|---|---|---|---|---|---|
| Ex. 1 | Bonding | Triangle/hexagonal | 0.2 | 1.1 | 0.8 | 0.5 | wave conversion component was observed using a magnifying glass so as to examine how many small chips and cracks it had.

Examples 2, 3 and Comparative Examples 1 to 3

Heat/acoustic wave conversion units as Examples 2, 3 and Comparative Examples 1 to 3 were manufactured by the same manufacturing method as that of the manufacturing method of Example 1 as stated above except that a die used for extrusion was different in the manufacturing method of the heat/acoustic wave conversion component, where these heat/acoustic wave conversion units were different from Example 1 only in the values of parameters (hydraulic diameter HD and HD/L) relating to the hydraulic diameter HD of the cells among the fourteen types of parameters as stated above.

Then, the two experiments 1 and 2 similar to those for Example 1 were conducted for these Examples 2, 3 and Comparative Examples 1 to 3.

Examples 4, 5 and Comparative Examples 4 to 8

Heat/acoustic wave conversion units as Examples 4, 5 and Comparative Examples 4 to 8 were manufactured by the same manufacturing method as that of the manufacturing method of Example 1 as stated above except that the length of extrusion was different during extrusion in the manufacturing method of the heat/acoustic wave conversion component, where these heat/acoustic wave conversion units were different from Example 1 only in the values of parameters (length L, L/D and HD/L of segment) relating to the length L of the segment among the fourteen types of parameters as stated above.

Then, the two experiments 1 and 2 similar to those for Example 1 were conducted for these Examples 4, 5 and Comparative Examples 4 to 8.

The following Table 3 shows the experimental results of Examples 1 to 5 and Comparative Examples 1 to 8 as explained above, together with the values of parameters different from those of Example 1.

In Table 3, as is found from a comparison between Examples 4, 5 and Comparative Examples 4 to 8 that were mutually different in ratio HD/L (further L and L/D), Examples 4, 5 had much higher energy conversion efficiency and much less damage than Comparative Examples 4 to 8. This shows that the ratio HD/L of 0.005 or more and less than 0.02 is required to have a large thermoacoustic effect and to avoid damage.

Herein, in Table 3, focusing on the length L of the honeycomb segment only, Comparative Example 4 and Comparative Example 8 had extremely bad results for both of the energy conversion efficiency and damage among Examples 4, 5 and Comparative Examples 4 to 8. Then, it can be said that the length L of the honeycomb segment that is about 5 mm or more and 60 mm or less is desirable.

The following describes other examples.

Examples 6 to 13

Heat/acoustic wave conversion units as Examples 6 to 13 were manufactured by the same manufacturing method as that of the manufacturing method of Example 1 as stated above except that a die used for extrusion was different in the manufacturing method of the heat/acoustic wave conversion component, where these heat/acoustic wave conversion units were different from Example 1 only in the values of the open frontal area of segments among the fourteen types of parameters as stated above.

Then, the two experiments 1 and 2 similar to those for Example 1 were conducted for these Examples 6 to 13.

Examples 14 to 18

Heat/acoustic wave conversion units as Examples 14 to 18 were manufactured by the same manufacturing method as that of the manufacturing method of Example 1 as stated above except that a ceramic raw material was different in the manufacturing method of the heat/acoustic wave conversion component, where these heat/acoustic wave conversion units were different from Example 1 only in the parameters (heat conductivity and thermal expansion coefficient) relat-

TABLE 3

| | Cell hydraulic diameter HD (mm) | Segment length L/heat/acoustic wave conversion component diameter D | Segment length L (mm) | Hydraulic diameter HD/segment length L | Energy conversion efficiency (%) | Damage degree |
|---|---|---|---|---|---|---|
| Ex. 1 | 0.2 | 0.75 | 30 | 0.0067 | 30 | 0 |
| Ex. 2 | 0.3 | 0.75 | 30 | 0.0100 | 27 | 0 |
| Ex. 3 | 0.4 | 0.75 | 30 | 0.0133 | 22 | 0 |
| Comp. Ex. 1 | 0.45 | 0.75 | 30 | 0.0150 | 9 | 0 |
| Comp. Ex. 2 | 0.6 | 0.75 | 30 | 0.0200 | 5 | 0 |
| Comp. Ex. 3 | 1 | 0.75 | 30 | 0.0333 | 2 | 0 |
| Comp. Ex. 4 | 0.2 | 0.1 | 4 | 0.0500 | 18 | 6 |
| Comp. Ex. 5 | 0.2 | 0.25 | 10 | 0.0200 | 19 | 3 |
| Ex. 4 | 0.2 | 0.3 | 12 | 0.0167 | 30 | 0 |
| Ex. 5 | 0.2 | 0.95 | 38 | 0.0053 | 32 | 0 |
| Comp. Ex. 6 | 0.2 | 1.1 | 44 | 0.0045 | 25 | 3 |
| Comp. Ex. 7 | 0.2 | 1.5 | 60 | 0.0033 | 23 | 3 |
| Comp. Ex. 8 | 0.2 | 1.6 | 64 | 0.0031 | 22 | 9 |

In Table 3, as is found from a comparison between Examples 1 to 3 and Comparative Examples 1 to 3 having mutually different hydraulic diameters HD of the cells (and ratios HD/L), Examples 1 to 3 had much higher energy conversion efficiency than Comparative Examples 1 to 3. This shows that the hydraulic diameter HD of cells of 0.4 mm or less is required to exert a large thermoacoustic effect.

ing to heat conductivity of the segments among the fourteen types of parameters as stated above. For Examples 14 and 15, the ratio of talc, kaolin, alumina and boehmite in Example 1 was changed, whereby the heat/acoustic wave conversion components had heat conductivity higher than or at the same degree as that of Example 1. For Examples 16 to 18, an alumina-cordierite based composite material, a metal silicon-silicon carbide-cordierite based composite material, and a silicon carbide-cordierite based composite material were used, respectively, instead of the cordierite forming raw material in Example 1, whereby they had different parameters relating to heat conductivity from that of Example 1.

Then, the two experiments 1 and 2 similar to those for Example 1 were conducted for these Examples 14 to 18.

Example 19

A heat/acoustic wave conversion unit as Example 19 was manufactured by the same manufacturing method as that of the manufacturing method of Example 1 as stated above except that it did not include the step to bond a plurality of honeycomb segments in the manufacturing method of the heat/acoustic wave conversion component, i.e., the heat/acoustic wave conversion component was manufactured including only one honeycomb segment, where the heat/acoustic wave conversion unit was different from Example 1 only in that the segmented structure (bonded type/monolithic type) was of a monolithic type.

Then, the two experiments 1 and 2 similar to those for Example 1 were conducted for this Example 19.

The following Table 4 shows the experimental results of Examples 6 to 19 as explained above, together with the values of parameters different from those of Example 1.

required to have a large thermoacoustic effect and to avoid damage.

In Table 4, as is found from a comparison between the monolithic Example 19 and Example 1 in Table 1 (see Table 3 for the experiment result), Example 1 had much less damage than Example 19. This shows that the bonded type is required to avoid damage.

Examples 20 to 22

Heat/acoustic wave conversion units as Examples 20 to 22 were manufactured by the same manufacturing method as that of the manufacturing method of Example 1 as stated above except that a different die was used during extrusion in the manufacturing method of the heat/acoustic wave conversion component, where these heat/acoustic wave conversion units were different from Example 1 in cell shape or honeycomb segment shape.

Then, the two experiments 1 and 2 similar to those for Example 1 were conducted for these Examples 20 to 22.

The following Table 5 shows the results, together with different cell shapes and honeycomb segment shapes from those of Example 1.

TABLE 4

|  | Segment open frontal area (%) | Segment heat conductivity (W/mK) | Segment thermal expansion coefficient (ppm/K) | Bonding/monolithic | Energy conversion efficiency (%) | Damage degree |
|---|---|---|---|---|---|---|
| Ex. 6 | 25 | 1 | 1.2 | Bonding | 2 | 0 |
| Ex. 7 | 35 | 1 | 1.2 | Bonding | 5 | 0 |
| Ex. 8 | 55 | 1 | 1.2 | Bonding | 9 | 0 |
| Ex. 9 | 60 | 1 | 1.2 | Bonding | 20 | 0 |
| Ex. 10 | 70 | 1 | 1.2 | Bonding | 21 | 0 |
| Ex. 11 | 80 | 1 | 1.2 | Bonding | 22 | 0 |
| Ex. 12 | 93 | 1 | 1.2 | Bonding | 22 | 0 |
| Ex. 13 | 95 | 1 | 1.2 | Bonding | 20 | 9 |
| Ex. 14 | 80 | 1 | 1.2 | Bonding | 28 | 0 |
| Ex. 15 | 80 | 1.5 | 1.2 | Bonding | 25 | 0 |
| Ex. 16 | 80 | 5 | 4 | Bonding | 20 | 2 |
| Ex. 17 | 80 | 5 | 4 | Bonding | 20 | 2 |
| Ex. 18 | 80 | 7 | 3 | Bonding | 5 | 9 |
| Ex. 19 | 80 | 1 | 1.2 | Monolithic | 30 | 9 |

In Table 4, as is found from a comparison between Examples 6 to 13 having mutually different open frontal areas of cells, Examples 9 to 12 had much higher energy conversion efficiency than Examples 6 to 8, and had much less damage than Example 13. This shows that the open frontal area at each end face of a honeycomb segment that is 60% or more and 93% or less is required to have adequate balance between a large thermoacoustic effect achieved and avoidance of damage.

In Table 4, as is found from a comparison between Examples 14 to 18 that were mutually different in heat conductivity (and thermal expansion coefficient), Examples 14 to 17 had much higher energy conversion efficiency and had much less damage than Example 18. This shows that the heat conductivity of the material making up the honeycomb segment that is 5 W/mK or less is

TABLE 5

|  | Cell shape/segment shape | Energy conversion efficiency (%) | Damage degree |
|---|---|---|---|
| Ex. 1 | Triangle/hexagonal | 30 | 0 |
| Ex. 20 | Triangle/triangle | 30 | 1 |
| Ex. 21 | Quadrangle/quadrangle | 28 | 3 |
| Ex. 22 | Hexagonal/hexagonal | 24 | 0 |

In Table 5, as is found from a comparison between Example 1 and Example 20 having the triangular cell shape and the triangular or hexagonal honeycomb segment shape and Examples 21 and 22 having other cell shapes and honeycomb segment shapes, Example 1 and Example 20 had slightly higher energy conversion efficiency than Examples 21 and 22. This shows that a triangular cell shape and a triangular or hexagonal honeycomb segment are preferable for a large thermoacoustic effect.

Examples 23 to 34

Heat/acoustic wave conversion units as Examples 23 to 34 were manufactured by the same manufacturing method as that of the manufacturing method of Example 1 as stated above except that materials of the circumferential wall and the bonding part were different in the manufacturing method of the heat/acoustic wave conversion component, where these heat/acoustic wave conversion units were different from Example 1 in any one of the Young's modulus at the circumferential wall, and the Young's modulus, the thermal expansion coefficient, and the heat capacity of the bonding part.

Then, the two experiments 1 and 2 similar to those for Example 1 were conducted for these Examples 23 to 34.

The following Table 6 shows the results, together with the values of the parameters different from those of Example 1.

TABLE 6

|  | Circumferential wall Young's modulus/segment Young's modulus | Bonding part Young's modulus/segment Young's modulus | Bonding part thermal expansion coefficient/segment thermal expansion coefficient | Bonding part heat capacity/segment heat capacity | Energy conversion efficiency (%) | Damage degree |
|---|---|---|---|---|---|---|
| Ex. 23 | 0.25 | 0.2 | 1.1 | 0.8 | 30 | 0 |
| Ex. 24 | 0.32 | 0.2 | 1.1 | 0.8 | 30 | 2 |
| Ex. 25 | 0.4 | 0.2 | 1.1 | 0.8 | 30 | 3 |
| Ex. 26 | 0.2 | 0.28 | 1.1 | 0.8 | 30 | 0 |
| Ex. 27 | 0.2 | 0.34 | 1.1 | 0.8 | 30 | 1 |
| Ex. 28 | 0.2 | 0.45 | 1.1 | 0.8 | 30 | 2 |
| Ex. 29 | 0.2 | 0.2 | 0.6 | 0.8 | 30 | 2 |
| Ex. 30 | 0.2 | 0.2 | 0.7 | 0.8 | 30 | 0 |
| Ex. 31 | 0.2 | 0.2 | 1.2 | 0.8 | 30 | 1 |
| Ex. 32 | 0.2 | 0.2 | 1.5 | 0.8 | 30 | 2 |
| Ex. 33 | 0.2 | 0.2 | 1.1 | 0.45 | 20 | 2 |
| Ex. 34 | 0.2 | 0.2 | 1.1 | 0.5 | 28 | 2 |

In Table 6, as is found from a comparison between Examples 23 to 25 having mutually different ratios of the Young's modulus at the circumferential wall to the Young's modulus of the honeycomb segment, Example 23 had slightly less damage than Examples 24 and 25. This shows that the Young's modulus of the material making up the circumferential wall being less than 30% of the Young's modulus of the material making up the honeycomb segment is preferable to avoid damage.

In Table 6, as is found from a comparison between Examples 26 to 28 having mutually different ratios of the Young's modulus at the bonding part to the Young's modulus of the honeycomb segment, Example 26 had slightly less damage than Examples 27 and 28. This shows that the Young's modulus of the material making up the bonding part being less than 30% of the Young's modulus of the material making up the honeycomb segment is preferable to avoid damage.

In Table 6, as is found from a comparison between Examples 29 to 32 having mutually different ratios of the thermal expansion coefficient at the bonding part to the thermal expansion coefficient of the honeycomb segment, Examples 30, 31 had slightly less damage than Examples 29 and 32. This shows that the thermal expansion coefficient of the material making up the bonding part being 70% or more and less than 130% of the thermal expansion coefficient of the material making up the honeycomb segment is preferable to avoid damage.

In Table 6, as is found from a comparison between Examples 33 and 34 having mutually different ratios of the heat capacity at the bonding part to the heat capacity of the honeycomb segment, Example 34 had higher energy conversion efficiency than Example 33. This shows that the heat capacity of the material making up the bonding part being 50% or more of the heat capacity of the material making up the honeycomb segment is preferable to have a larger thermoacoustic effect.

Examples 35 to 38

Heat/acoustic wave conversion units as Examples 35 to 38 were manufactured by the same manufacturing method as that of the manufacturing method of Example 1 as stated above except that different dies were used during extrusion in the manufacturing method of the heat/acoustic wave conversion component, where these heat/acoustic wave conversion units were different from Example 1 only in the value of cross-sectional area of the honeycomb segment among the fourteen types of parameters as stated above.

Then, the two experiments 1 and 2 similar to those for Example 1 were conducted for these Examples 35 to 38.

Examples 39 to 41

Heat/acoustic wave conversion units as Examples 39 to 41 were manufactured by the same manufacturing method as that of the manufacturing method of Example 1 as stated above except that a cordierite forming raw material used was different in the manufacturing method of the heat/acoustic wave conversion component, where these heat/acoustic wave conversion units were different from Example 1 only in the value of thermal expansion coefficient of the honeycomb segments among the fourteen types of parameters as stated above. Herein, the heat/acoustic wave conversion components of these Examples 39 to 41 had larger thermal expansion coefficients than Example 1 by changing the ratio of talc, kaolin, alumina and boehmite in Example 1.

Then, the two experiments 1 and 2 similar to those for Example 1 were conducted for these Examples 39 to 41.

The following Table 7 shows the results of Examples 35 to 41 as described above, together with the values of the parameters different from those of Example 1.

TABLE 7

|        | Segment cross-sectional area (cm²) | Segment thermal expansion coefficient (ppm/K) | Energy conversion efficiency (%) | Damage degree |
|--------|------|-----|----|---|
| Ex. 35 | 2.5  | 1.2 | 25 | 3 |
| Ex. 36 | 3    | 1.2 | 30 | 0 |
| Ex. 37 | 12   | 1.2 | 30 | 0 |
| Ex. 38 | 12.5 | 1.2 | 24 | 5 |
| Ex. 39 | 9    | 3.7 | 30 | 0 |
| Ex. 40 | 9    | 6   | 30 | 2 |
| Ex. 41 | 9    | 8   | 30 | 6 |

In Table 7, as is found from a comparison between Examples 35 to 38 having different cross-sectional areas of the honeycomb segment, Examples 36 and 37 had slightly higher energy conversion efficiency and slightly less damage than Examples 35 and 38. This shows that the cross-sectional area of one honeycomb segment of 3 cm² or more and 12 cm² or less is preferable for a larger thermoacoustic effect and avoidance of damage.

In Table 7, as is found from a comparison between Examples 39 to 41 having different thermal expansion coefficients of the honeycomb segment, Examples 39 and 40 had slightly less damage than Example 41. This shows that the thermal expansion ratio of one honeycomb segment of 6 ppm/K or less is preferable for avoidance of damage.

Examples 42 to 45

Heat/acoustic wave conversion units as Examples 42 to 45 were manufactured by the same manufacturing method as that of the manufacturing method of Example 1 as stated above except that, in the manufacturing method of the heat/acoustic wave conversion component, the diameter of the circle-shape was different when the circumferential part of a plurality of honeycomb segments mutually bonded as a whole was cut to be the circular-shape, and a pair of heat exchangers in the vicinity of both end parts of the heat/acoustic wave conversion component, respectively, also had diameters changed so as to match with the diameter D of the heat/acoustic wave conversion component, where these heat/acoustic wave conversion units were different from Example 1 only in the value of parameters (diameter D and L/D of the heat/acoustic wave conversion component) relating to the diameter D of the heat/acoustic wave conversion component among the fourteen types of parameters as stated above. Herein, in a comparison with Example 1, these Examples 42 to 45 had a different number of honeycomb segments included in the heat/acoustic wave conversion components (the width of the bonding part was the same).

Then, the two experiments 1 and 2 similar to those for Example 1 were conducted for these Examples 42 to 45.

Examples 46 to 49

Heat/acoustic wave conversion units as Examples 46 to 49 were manufactured by the same manufacturing method as that of the manufacturing method of Example 1 as stated above except that the width of the bonding part was different when a plurality of honeycomb segments were bonded in the manufacturing method of the heat/acoustic wave conversion component, where these heat/acoustic wave conversion units were different from Example 1 only in the value of parameters (width of the bonding part and the diameter D of the heat/acoustic wave conversion components) relating to the width of the bonding part among the fourteen types of parameters as stated above.

Then, the two experiments 1 and 2 similar to those for Example 1 were conducted for these Examples 46 to 49.

The following Table 8 shows the results of Examples 42 to 49 as described above, together with the values of the parameters different from those of Example 1.

TABLE 8

|        | Heat/acoustic wave conversion component diameter D (mm) | Bonding part width (mm) | Segment length L/heat/acoustic wave conversion component diameter D | Energy conversion efficiency (%) | Damage degree |
|--------|-----|------|------|----|---|
| Ex. 42 | 28  | 0.5  | 1.07 | 24 | 2 |
| Ex. 43 | 32  | 0.5  | 0.94 | 30 | 0 |
| Ex. 44 | 100 | 0.5  | 0.3  | 30 | 0 |
| Ex. 45 | 120 | 0.5  | 0.25 | 25 | 5 |
| Ex. 46 | 40  | 0.15 | 0.75 | 30 | 3 |
| Ex. 47 | 40  | 0.3  | 0.75 | 30 | 0 |
| Ex. 48 | 41  | 3.5  | 0.73 | 26 | 0 |
| Ex. 49 | 42  | 5    | 0.71 | 25 | 3 |

In Table 8, as is found from a comparison between Examples 42 to 45 having different diameters D (and L/D) of the heat/acoustic wave conversion components, Examples 43 and 44 had slightly higher energy conversion efficiency and slightly less damage than Examples 42 and 45. This shows that the diameter D of the heat/acoustic wave conversion component of 30 mm or more and 100 mm or less and L/D of 0.3 or more and 1.0 or less are preferable for a larger thermoacoustic effect and avoidance of damage.

In Table 8, as is found from a comparison between Examples 46 to 49 having different bonding widths, Examples 47 and 48 had slightly less damage than Examples 46 and 49. This shows that the bonding width between neighboring honeycomb segments of 0.2 mm or more and 4 mm or less is preferable for avoidance of damage. Herein, when the bonding width is actually 0.2 mm or more and 4 mm or less, the ratio of the total cross-sectional area of the bonding part to the cross-sectional area of the heat/acoustic wave conversion component in the plane (perpendicular plane) perpendicular to the cell penetrating direction is actually 10% or less. That is, it can be said that preferably the bonding width is 0.2 mm or more and 4 mm or less and the ratio of the total cross-sectional area of the bonding part to the cross-sectional area of the heat/acoustic wave conversion component is 10% or less.

The following describes Examples and Comparative Examples having different configurations of the heat exchanger from that of Example 1.

Example 50

A heat/acoustic wave conversion unit as Example 50 was manufactured by the same manufacturing method as that of the manufacturing method of Example 1 as stated above except that, as a heating member to heat an end part of the heat/acoustic wave conversion component in the high-temperature side heat exchanger, a mesh lamination body that was the same as the mesh lamination body made of copper in the low-temperature side heat exchanger was used instead of the heat-exchanging honeycomb structure.

Example 51

A heat/acoustic wave conversion unit as Example 51 was manufactured by the same manufacturing method as that of the manufacturing method of Example 1 as stated above except that, as a structure body to increase the contact area with heated fluid, a fin made of stainless steel was used instead of the in-tube honeycomb structure.

Comparative Example 9

A heat/acoustic wave conversion unit as Comparative Example 9 was manufactured by the same manufacturing method as that of the manufacturing method of Example 1 as stated above except that, as a heating member, a mesh lamination body that was the same as the mesh lamination body made of copper in the low-temperature side heat exchanger was used instead of the heat-exchanging honeycomb structure, and as the structure body, a fin made of stainless steel was used instead of the in-tube honeycomb structure.

Comparative Example 10

A heat/acoustic wave conversion unit as Comparative Example 10 was manufactured by the same manufacturing method as that of the manufacturing method of Example 1 as stated above except that no members as the structure body were used at all.

Comparative Example 11

A heat/acoustic wave conversion unit as Comparative Example 11 was manufactured by the same manufacturing method as that of the manufacturing method of Example 1 as stated above except that, as a heating member, a tube-type stainless steel was used instead of the heat-exchanging honeycomb structure so that this tube-type stainless steel came in contact with the heat/acoustic wave conversion component, and as the structure body, a fin made of stainless steel was used instead of the in-tube honeycomb structure.

Example 52

A heat/acoustic wave conversion unit as Example 52 was manufactured by the same manufacturing method as that of the manufacturing method of Example 1 as stated above except that the heat-exchanging honeycomb structure was brought into contact with the heat/acoustic wave conversion component.

Example 53

A heat/acoustic wave conversion unit as Example 53 was manufactured by the same manufacturing method as that of the manufacturing method of Example 1 as stated above except that as the structure body, a fin made of stainless steel was used instead of the in-tube honeycomb structure, the heat-exchanging honeycomb structure was brought into contact with the heat/acoustic wave conversion component, a honeycomb structure that was the same as the heat-exchanging honeycomb structure in the high-temperature side heat exchanger was used instead of the mesh lamination body made of copper in the low-temperature side heat exchanger, and a part of the heat-exchanging honeycomb structure as the heating member was exposed partly so that the heat-exchanging honeycomb structure at the part came in contact with heated fluid directly.

Example 54

A heat/acoustic wave conversion unit as Example 54 was manufactured by the same manufacturing method as that of the manufacturing method of Example 1 as stated above except that as the structure body, a fin made of stainless steel was used instead of the in-tube honeycomb structure, the heat-exchanging honeycomb structure was brought into contact with the heat/acoustic wave conversion component, the period of the cells in the heat-exchanging honeycomb structure was not integral multiples of the period of cells in the heat/acoustic wave conversion component, and a part of the heat-exchanging honeycomb structure was exposed partly so that the heat-exchanging honeycomb structure at the part came in contact with heated fluid directly.

Example 55

A heat/acoustic wave conversion unit as Example 55 was manufactured by the same manufacturing method as that of the manufacturing method of Example 1 as stated above except that as the structure body, a fin made of stainless steel was used instead of the in-tube honeycomb structure, and a part of the heat-exchanging honeycomb structure was exposed partly so that the heat-exchanging honeycomb structure at the part came in contact with heated fluid directly.

Experiment 1 similar to that for Example 1 was conducted using the heat/acoustic wave conversion unit as Examples 1, 50 to 55 and Comparative Examples 9 to 11 as stated above, and their energy conversion efficiency was obtained. At this time, temperature change of each member making up the high-temperature side heat exchanger, such as a heating member, also was examined, and the amount of heat in the total amount of heat transmitted from the heated fluid that was consumed to increase the temperature of the high-temperature side heat exchanger itself was obtained. Then, considering that the remaining amount of heat was transmitted to the end part of the heat/acoustic wave conversion component, the collection rate of heat energy (energy collection rate) from the heated fluid was obtained by dividing the total amount of heat transmitted to the end part of the heat/acoustic wave conversion component by the total amount of heat transmitted from the heated fluid.

The following Table 9 shows the results of Examples 1, 50 to 55 and Comparative Examples 9 to 11 as described above, together with the values of the parameters different from those of Example 1.

TABLE 9

| | Heating member to heat end part of heat/acoustic wave conversion component | Structure body to increase contact area with heated fluid | Contact between heated fluid and heating member | Cooling member to cool end part of heat/acoustic wave conversion component |
|---|---|---|---|---|
| Ex. 1 | SiC honeycomb structure | SiC honeycomb structure | Non-contact | Copper mesh |
| Ex. 50 | Copper mesh | SiC honeycomb structure | Non-contact | Copper mesh |
| Ex. 51 | SiC honeycomb structure | Stainless steel fin | Non-contact | Copper mesh |
| Comp Ex. 9 | Copper mesh | Stainless steel fin | Non-contact | Copper mesh |

TABLE 9-continued

| | | | | |
|---|---|---|---|---|
| Comp Ex. 10 | SiC honeycomb structure | None | Non-contact | Copper mesh |
| Comp Ex. 11 | Tube-type stainless steel | Stainless steel fin | Non-contact | Copper mesh |
| Ex. 52 | SiC honeycomb structure | Stainless steel fin | Non-contact | Copper mesh |
| Ex. 53 | SiC honeycomb structure | Stainless steel fin | Contact | SiC honeycomb structure |
| Ex. 54 | SiC honeycomb structure | Stainless steel fin | Contact | Copper mesh |
| Ex. 55 | SiC honeycomb structure | Stainless steel fin | Contact | Copper mesh |

| | Cell period of heating member/cell period of heat/acoustic wave conversion component | Contact between heating member and heat/acoustic wave conversion component | Energy collection rate from heated fluid (%) | Energy conversion ratio (%) |
|---|---|---|---|---|
| Ex. 1 | Integral multiple | Non-contact | 50 | 27 |
| Ex. 50 | / | Non-contact | 40 | 27 |
| Ex. 51 | Integral multiple | Non-contact | 35 | 27 |
| Comp Ex. 9 | / | Non-contact | 15 | 27 |
| Comp Ex. 10 | Integral multiple | Non-contact | 5 | 27 |
| Comp Ex. 11 | / | Contact | 20 | 8 |
| Ex. 52 | Integral multiple | Contact | 20 | 18 |
| Ex. 53 | Integral multiple | Contact | 20 | 32 |
| Ex. 54 | Non-Integral multiple | Contact | 20 | 18 |
| Ex. 55 | Integral multiple | Non-contact | 20 | 24 |

In Table 9, as is found from a comparison between Examples 1, 50, 51 and Comparative Examples 9 to 11 having mutually different heating members and the structure bodies, Examples 1, 50, 51 had higher energy collection rates than Comparative Examples 9 to 11. This shows that the structure body disposed to increase the contact area with heated fluid, as in Examples 1, 50 and 51, is important, and further that it is important that at least one of this structure body and the heating member to heat the end part of the heat/acoustic wave conversion component is a honeycomb structure made of SiC.

As is found from a comparison between the remaining Examples 52 to 55, Examples 53, 55 had higher energy collection efficiency than Examples 52, 54. This shows that a SiC honeycomb structure is preferably used as the cooling member in the low-temperature side heat exchanger, and the period of the cells of the heat-exchanging honeycomb structure preferably is integral multiples of the period of cells in the heat/acoustic wave conversion component.

Then, in order to confirm the effect of the two configurations during extrusion as stated above, the following experiment for extrusion was conducted for reference experiment.

(1) Extrusion for a heat/acoustic wave conversion component was attempted by the same manufacturing method as that of Example 1 except that the dummy die used had a rib thickness of 0.09 mm.

(2) Extrusion for a heat/acoustic wave conversion component was attempted by the same manufacturing method as that of Example 1 except that the dummy die used had a rib thickness of 0.10 mm.

(3) Extrusion for a heat/acoustic wave conversion component was attempted by the same manufacturing method as that of Example 1 except that the dummy die used had a rib thickness of 0.04 mm.

(4) Extrusion for a heat/acoustic wave conversion component was attempted by the same manufacturing method as that of Example 1 except that the dummy die used had a rib thickness of 0.03 mm.

(5) Extrusion for a heat/acoustic wave conversion component was attempted by the same manufacturing method as that of Example 1 except that the kneaded material used included water at the ratio in the kneaded material that was about 43 parts by mass (error was within ±1 part by mass) with reference to 100 parts by mass of the kneaded material solid component.

(6) Extrusion for a heat/acoustic wave conversion component was attempted by the same manufacturing method as that of Example 1 except that the kneaded material used included water at the ratio in the kneaded material that was about 39 parts by mass (error was within ±1 part by mass) with reference to 100 parts by mass of the kneaded material solid component.

As a result, forming was enabled without problems in (1) and (3), but in (2) and (6), clogging of the kneaded material occurred in the holes in the forming die, and so forming failed. In (4), considerable pressure was required for extrusion by the dummy die, which showed the possibility of damage in the die, and so the experiment was stopped. In (5), the formed body obtained by the extrusion was deformed easily due to the self weight, and a desired shape was not obtained.

Considering these results together with the successful result of extrusion in Example 1, it can be found that pre-extrusion is preferably performed using a dummy die having a rib thickness of 0.04 mm or more and 0.09 mm or less and the ratio of water in the kneaded material is preferably 40 to 42 parts by mass with reference to 100 parts by mass of the kneaded material solid component.

The present invention is favorably used in a system that effectively uses heat from exhaust gas of automobiles or the like to generate electric power and cold heat.

DESCRIPTION OF REFERENCE NUMERALS

1: heat/acoustic wave conversion component
1a: interference member
2, 2', 2A, 2A': high-temperature side heat exchanger
3: low-temperature side heat exchanger
3A: low-temperature side heat exchanger
4: looped tube
4': looped tube
5: resonant tube
5': transmission tube
6: energy converter
7: acoustic-wave generation part
11: partition wall
12: bonding part
12': bonding part
13: circumferential wall
14: cell 15: honeycomb segment
15': honeycomb segment
20: heat-exchanging honeycomb structure
20': heat-exchanging honeycomb structure
20a: partition wall
20b: circumferential wall
20c: slit
20d: cell
20s: contact face
21: high-temperature side annular tube
211: high-temperature side annular tube
212: high-temperature side annular tube
2110: in-tube honeycomb structure
2120: in-tube honeycomb structure
21a: inflow port
21b: outflow port
21c: heat-receiving region
21d: heat-resistant metal plate
21e: fin
22, 23: honeycomb structure
23': metal mesh member
22a: metal outer tube
23a: metal mesh outer tube
23b: metalized layer
30: mesh lamination body
31: low-temperature side annular tube
31a: inflow port
31b: outflow port
32: metal member
301: die
303: second plate-shaped part
305: back hole
305a, 309a, 311a: open end
306: second bonding face
307: first plate-shaped part
307a: first layer
307b: second layer
307ba: other face of second layer
309: slit
310: first bonding face
311: hole part
313: cell block
401: die
402: retainer
403: rear retaining part
404: honeycomb formed body
405: gap
406: inclined face
407: opposed face
550: retainer plate configuration
552: slit
553: back hole
554: die
555: retaining plate
557: gap part
558: retaining jig
559: rear-retaining plate
561: extruded forming raw material
571: inside part
572: circumference part
573, 574: slit
575: step height
602, 702: slit
603, 703: back hole
604, 704: die
605, 705: retaining plate
615, 715: step height
100: heat/acoustic wave conversion unit
200: heat/acoustic wave conversion unit
100a: housing
1000: power generation system
2000: cold heat generation system

What is claimed is:

1. A heat/acoustic wave conversion unit, comprising:
a heat/acoustic wave conversion component having a first end face and a second end face, the heat/acoustic wave conversion component including a partition wall that defines a plurality of cells extending from the first end face to the second end face, inside of the cells being filled with working fluid that oscillates to transmit acoustic waves, the heat/acoustic wave conversion component mutually converting heat exchanged between the partition wall and the working fluid and energy of acoustic waves resulting from oscillations of the working fluid;
a low-temperature side heat exchanger that is disposed adjacent to a first end part of the heat/acoustic wave conversion component on the first end face side, the low-temperature side heat exchanger exchanging heat with the first end part; and
a high-temperature side heat exchanger that is disposed adjacent to a second end part of the heat/acoustic wave conversion component on the second end face side, the high-temperature side heat exchanger receiving inflow of heated fluid and absorbing heat from the heated fluid, and supplying the heat to the second end part so as to keep the second end part at a state of higher temperature than at the first end part, wherein
hydraulic diameter HD of the heat/acoustic wave conversion component is 0.4 mm or less, where the hydraulic diameter HD is defined as $HD=4\times S/C$, where S denotes an area of a cross section of each cell perpendicular to the cell extending direction and C denotes a perimeter of the cross section,
let that the heat/acoustic wave conversion component has a length L from the first end face to the second end face, a ratio HD/L of the hydraulic diameter HD to the length L of the heat/acoustic wave conversion component is 0.005 or more and less than 0.02, and
the high-temperature side heat exchanger includes:
a heat-exchanging honeycomb structure having a partition wall that defines two or more cells which extend in the extending direction between two end faces, an opposed end face facing to the second end face of the heat/acoustic wave conversion component and a non-opposed end face facing to an opposite side from the heat/acoustic wave conversion component when viewed from the opposed end face, and which are filled with the working fluid internally so as to be a propagation path of acoustic waves due to oscillations of the working fluid; and
an annular tube that surrounds a circumferential face of the heat-exchanging honeycomb structure, which extends between the two end faces, and that defines a channel through which the heated fluid flows, the annular tube including a structure body that is disposed in the channel to increase a contact area with the heated fluid, an inflow port into which the heated fluid flows, and an outflow port through which the heated fluid flows out,
wherein at least one of the heat-exchanging honeycomb structure and the structure body is made of a ceramic material that contains SiC as a main component.

2. The heat/acoustic wave conversion unit according to claim 1, wherein the heat/acoustic wave conversion component has an open frontal area at an end face of 93% or less.

3. The heat/acoustic wave conversion unit according to claim 1, wherein the cells in the heat/acoustic wave conversion component have a triangular shape in the cross section.

4. The heat/acoustic wave conversion unit according to claim 1, wherein let that D denotes an equivalent circle diameter of a cross section of the heat/acoustic wave conversion component in a plane perpendicular to the extending direction, the equivalent circle diameter D is 30 mm or more and 100 mm or less, and a ratio L/D of the length L of the heat/acoustic wave conversion component to the equivalent circle diameter D is 0.3 or more and 1.0 or less.

5. The heat/acoustic wave conversion unit according to claim 1, wherein the heat/acoustic wave conversion component includes:
   a plurality of monolithic honeycomb segments, each including the partition wall that defines some of the plurality of cells, and mutually converting heat exchanged between the partition wall and the working fluid and energy of acoustic waves resulting from oscillations of the working fluid;
   a bonding part that mutually bonds side faces of the plurality of honeycomb segments; and
   a circumferential wall that surrounds a circumferential face of a honeycomb structure body made up of the plurality of honeycomb segments and the bonding part, wherein
   an open frontal area at each end face of the honeycomb segments is 60% or more and 93% or less, and
   heat conductivity of a material making up the honeycomb segments is 5 W/mK or less.

6. The heat/acoustic wave conversion unit according to claim 5, wherein the cells have the cross section of a triangular shape, and a cross section of the honeycomb segments that is parallel to the cross section of the cells has a hexagonal shape.

7. The heat/acoustic wave conversion unit according to claim 5, wherein the cells have the cross section of a triangular shape, and a cross section of the honeycomb segments that is parallel to the cross section of the cells has a triangular shape.

8. The heat/acoustic wave conversion unit according to claim 5, wherein Young's modulus of materials making up the bonding part and the circumferential wall are both less than 30% of Young's modulus of a material making up the honeycomb segments, a thermal expansion coefficient of the material making up the bonding part is 70% or more and less than 130% of a thermal expansion coefficient of the material making up the honeycomb segments, and heat capacity of the material making up the bonding part is 50% or more of heat capacity of the material making up the honeycomb segments.

9. The heat/acoustic wave conversion unit according to claim 5, wherein a bonding width of two of the honeycomb segments bonded mutually is 0.2 mm or more and 4 mm or less, and in a plane perpendicular to the extending direction, a ratio of a total cross-sectional area of the bonding part to a cross-sectional area of the heat/acoustic wave conversion component is 10% or less.

10. The heat/acoustic wave conversion unit according to claim 5, wherein each of the plurality of honeycomb segments has a cross-sectional area in a plane perpendicular to the extending direction that is 3 $cm^2$ or more and 12 $cm^2$ or less.

11. The heat/acoustic wave conversion unit according to claim 5, wherein let that D denotes an equivalent circle diameter of a cross section of the heat/acoustic wave conversion component in a plane perpendicular to the extending direction, the equivalent circle diameter D is 30 mm or more and 100 mm or less, and a ratio L/D of the length L of the honeycomb segments to the equivalent circle diameter D is 0.3 or more and 1.0 or less.

12. The heat/acoustic wave conversion unit according to claim 1, wherein the heat-exchanging honeycomb structure directly comes in contact with heated fluid flowing through the channel at the circumferential face to absorb heat from the heated fluid, and transmits the absorbed heat from the opposed end face to the second end part of the heat/acoustic wave conversion component.

13. The heat/acoustic wave conversion unit according to claim 1, wherein the opposed end face of the heat-exchanging honeycomb structure is in contact with the second end face of the heat/acoustic wave conversion component.

14. The heat/acoustic wave conversion unit according to claim 1, wherein
   the plurality of cells in the heat/acoustic wave conversion component and the two or more cells in the heat-exchanging honeycomb structure are both arranged periodically in a plane perpendicular to the extending direction, and
   the two or more cells have a period in one direction in the plane that is integral multiples of ten or more of a period of the plurality of cells in the one direction.

15. The heat/acoustic wave conversion unit according to claim 1, wherein the heat-exchanging honeycomb structure includes a slit extending in the extending direction at the circumferential face.

* * * * *